(12) United States Patent
Tsutsumi

(10) Patent No.: US 8,553,282 B2
(45) Date of Patent: Oct. 8, 2013

(54) IMAGE PROCESSING APPARATUS AND METHOD FOR PROCESSING IMAGE DATA INCLUDING A FUNDAMENTAL STIMULUS VALUE AND SPECTRAL AUXILIARY COEFFICIENT

(75) Inventor: Shohei Tsutsumi, Yokohama (JP)

(73) Assignee: Canon Kabushiki Kaisha, Toky (JP)

( * ) Notice: Subject to any disclaimer, the term of this patent is extended or adjusted under 35 U.S.C. 154(b) by 732 days.

(21) Appl. No.: 12/740,320

(22) PCT Filed: Oct. 17, 2008

(86) PCT No.: PCT/JP2008/069284
§ 371 (c)(1),
(2), (4) Date: Apr. 28, 2010

(87) PCT Pub. No.: WO2009/057511
PCT Pub. Date: May 7, 2009

(65) Prior Publication Data
US 2010/0231941 A1    Sep. 16, 2010

(30) Foreign Application Priority Data
Oct. 30, 2007  (JP) ................. 2007-281831

(51) Int. Cl.
*G06K 15/00* (2006.01)
*G06K 9/00* (2006.01)
*H04N 9/73* (2006.01)

(52) U.S. Cl.
USPC ............ 358/1.9; 358/2.1; 358/3.01; 382/167; 382/168

(58) Field of Classification Search
None
See application file for complete search history.

(56) References Cited

U.S. PATENT DOCUMENTS

| | | | |
|---|---|---|---|
| 6,337,746 B1 * | 1/2002 | Coyle et al. | 358/1.15 |
| 6,879,716 B1 * | 4/2005 | Ishibashi | 382/166 |
| 6,888,963 B2 * | 5/2005 | Nichogi | 382/167 |
| 2005/0111017 A1 * | 5/2005 | Takahashi et al. | 358/1.9 |

FOREIGN PATENT DOCUMENTS

| | | |
|---|---|---|
| JP | H11-275376 A | 10/1999 |
| JP | 2003-032497 A | 1/2003 |
| JP | 2005-078171 A | 3/2005 |

OTHER PUBLICATIONS

Tsutsumi, et al. "Spectral Color Management using Interim Connection Spaces based on Spectral Decomposition", Color Imaging Conference, USA, Imaging Science and Technology, Nov. 2004, pp. 246-250.

Yonghui Zhao, et al., "Image-Based Spectral Reflectance Reconstruction Using the Matrix R Method", Color Research and Application, Oct. 2007, vol. 32, No. 5, XP002599916.

Francisco H. Imai, et al., "High-Resolution Multi-Spectral Image Archives: A Hybrid Approach", The Sixth Color Imaging Conference: Color Science, Systems, and Applications, Nov. 1998, XP00259917.

(Continued)

*Primary Examiner* — Steven Kau
(74) *Attorney, Agent, or Firm* — Canon USA Inc IP Division

(57) ABSTRACT

This invention reduces an increasing capacity of image data by using PQR (spectral auxiliary coefficients) in addition to CIELAB (fundamental stimulus values), compared to conventional CIELAB. To accomplish this, image data holding fundamental stimulus values and spectral auxiliary coefficients is input. Output colors corresponding the input fundamental stimulus values and spectral auxiliary coefficients are calculated. An image size corresponding to the spectral auxiliary coefficient is smaller than that corresponding to the fundamental stimulus.

23 Claims, 21 Drawing Sheets

(56) References Cited

OTHER PUBLICATIONS

M.J. Vrhel, et al., "Color Correction Using Principal Components", Color Research and Application, Oct. 1992, vol. 17, No. 5, XP00259918.

Maxim W. Derhak, et al. Spectral Colorimetry Using LabPQR—An Interim Connection Space, Twelfth Color Imaging Conference: Color Science and Engineering Systems, Technologies, and Applications, Scottsdale, AZ; Nov. 2004; pp. 246-250, Society for Imaging Science and Technology, Springfield, VA, 2004.

Shohei Tsutsumi, et al. Spectral Color Management using Interim Connection Spaces Based on Spectral Decomposition, Nov. 2006.

* cited by examiner

FIG. 24

| | | P | Q | R | S |
|---|---|---|---|---|---|
| SETTINGS OF SPECTRAL AUXILIARY IMAGE | | | | | |
| NUMBER OF DIMENSIONS | 3 | | | | |
| CHANGE SIZE (%) | | 100 | 75 | 50 | ☒ |
| BIT COUNT | | 8 | 6 | 4 | ☒ |

IMAGE PROCESSING APPARATUS AND METHOD FOR PROCESSING IMAGE DATA INCLUDING A FUNDAMENTAL STIMULUS VALUE AND SPECTRAL AUXILIARY COEFFICIENT

CROSS REFERENCE TO RELATED APPLICATIONS

This application is a National Stage filing of PCT application No. PCT/JP2008/069284 filed on Oct. 17, 2008 which claims priority from Japanese Patent Application No. 2007-281831 filed on Oct. 30, 2007, which are hereby incorporated by reference herein in their entirety.

BACKGROUND OF THE INVENTION

1. Field of the Invention

The present invention relates to an image processing apparatus and method for processing image data including a fundamental stimulus value and spectral auxiliary coefficient.

2. Description of the Related Art

The colors of printing materials for forming an output image by a conventional color printing apparatus are generally three, cyan (C), magenta (M), and yellow (Y) subtractive primary colors, or four colors including black (K) in addition to these three colors. In this case, three, red (R), green (G), and blue (B) color components of input image data are converted into three, C, M, and Y colors or four, C, M, Y, and K colors, forming an image with printing materials of the respective colors. These days, color printing apparatuses using basic colorant materials of four, C, M, Y, and K colors, and those of three, R, G, and B spot colors other than the three subtractive primary colors have appeared on the market. This color printing apparatus can implement color reproduction which has not been achieved by conventional three- or four-color image formation.

Along with recent rapid popularization of color printing apparatuses, a demand for higher image quality is growing. There is proposed the use of spectral information of the visible wavelength region as information input to a color printing apparatus. Recently, a multi-band camera with five or six sensitivities is used as a device for acquiring spectral information of an image. The multi-band camera can acquire the spectral reflectance factor of an object that cannot be obtained by a conventional 3-channel camera. The multi-band camera and the color printing apparatus using spot color inks can be combined into a color reproduction system capable of reproducing spectral information of an object.

In an image processing (to be referred to as a spectral image processing hereinafter) for processing spectral information, the output colors of the color printing apparatus need to be determined to minimize a spectral error from spectral information input from the multi-band camera. The spectral image processing can provide the perceived color on an output image regardless of the observation environment such as the environment light source. That is, the spectral image processing can reduce metamerism.

However, the spectral image processing greatly increases the number of dimensions of process data in comparison with tristimulus values such as CIELAB or CIEXYZ. For example, when spectral information is sampled at intervals of 10 nm from 400 nm to 700 nm, the number of dimensions of obtained spectral data becomes 31. To execute a simpler spectral image processing, it is important to reduce the number of dimensions and effectively compress data without impairing spectral characteristics.

As a spectral information data compression method, principal component analysis is done for input spectral image data to hold weighting factor data for each principal component (see, e.g., Japanese Patent Laid-Open No. 2005-78171). According to this proposal, spectral intensity data of a thinned-out or downscaled image is used together with sRGB fundamental color data, so image data can be processed as one having conventional RGB data.

As another spectral information data compression method, a spectral information compression method using a six-dimensional spectral color space LabPQR is proposed (see, e.g., M. Derhak, M. Rosen, "Spectral Colorimetry Using LabPQR—An Interim Connection Space", "Color Imaging Conference 2004", USA, Imaging Science and Technology, November 2004, pp. 246-250). Since LabPQR includes L*a*b* (L*, a*, and b*) values, color reproduction identical to colorimetric color reproduction can be achieved under a specific L*a*b* value-dependent observation condition. Further, since LabPQR includes spectral information PQR, metamerism can be reduced.

However, according to the method proposed in Japanese Patent Laid-Open No. 2005-78171, spectral intensity data is expressed by the weighting factor of principal component analysis of input spectral image data. Information redundancy remains between fundamental color data and spectral intensity data. When the number of dimensions of data necessary to hold spectral image information is six, the number of dimensions of data compression becomes nine including three-dimensional fundamental color data, increasing the capacity of data processed when performing an image processing.

According to the method proposed in "Spectral Colorimetry Using LabPQR—An Interim Connection Space", P, Q, and R (PQR) images serving as spectral information undergo the same calculation process when compressing input spectral information via the 6D spectral color space LabPQR. The method proposed in this reference requires a large memory capacity to save LabPQR images.

SUMMARY OF THE INVENTION

The present invention enables realization of an image processing apparatus and image processing method capable of making color reproduction consistent with conventional colorimetric color reproduction, and effectively processing spectral information in terms of the data capacity.

One aspect of the present invention provides an image processing apparatus comprising: an input unit configured to input image data which includes a fundamental stimulus value and a spectral auxiliary coefficient and represents an image; and an image processing unit configured to perform an image processing for the image data, wherein the spectral auxiliary coefficient corresponds to a spectral error generated when estimating spectral information from the fundamental stimulus value, and an image size corresponding to the spectral auxiliary coefficient representing the image is smaller than an image size corresponding to the fundamental stimulus value representing the image.

Another aspect of the present invention provides an image processing apparatus comprising: an input unit configured to input image data which includes a fundamental stimulus value and a spectral auxiliary coefficient and represents an image; and an image processing unit configured to perform an image processing for the image data, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and an image size corresponding to the second coefficient representing the image is smaller than an image size corresponding to the first coefficient representing the image.

Still another aspect of the present invention provides an image processing apparatus comprising: an input unit configured to input image data which includes a fundamental stimulus value and a spectral auxiliary coefficient and represents an image; and an image processing unit configured to perform an image processing for the image data, wherein the spectral auxiliary coefficient corresponds to a spectral error generated when estimating spectral information from the fundamental stimulus value, and a bit count of the spectral auxiliary coefficient is smaller than a bit count of the fundamental stimulus value.

Yet another aspect of the present invention provides an image processing apparatus comprising: an input unit configured to input image data which includes a fundamental stimulus value and a spectral auxiliary coefficient and represents an image; and an image processing unit configured to perform an image processing for the image data, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and a bit count of the second coefficient is smaller than a bit count of the first coefficient.

Still yet another aspect of the present invention provides an image processing apparatus comprising: an input unit configured to input spectral information of an image; a calculation unit configured to calculate a fundamental stimulus value and a spectral auxiliary coefficient from the spectral information; a downscaling unit configured to downscale an image size corresponding to the spectral auxiliary coefficient; and a storage unit configured to store, as an image file, a combination of the calculated fundamental stimulus value and the downscaled spectral auxiliary coefficient, wherein the spectral auxiliary coefficient corresponds to a spectral error generated when estimating spectral information from the fundamental stimulus value, and an image size corresponding to the spectral auxiliary coefficient stored in the image file is smaller than an image size corresponding to the fundamental stimulus value stored in the image file.

Yet still another aspect of the present invention provides an image processing apparatus comprising: an input unit configured to input spectral information of an image; a calculation unit configured to calculate a fundamental stimulus value and a spectral auxiliary coefficient from the spectral information; a downscaling unit configured to downscale an image size corresponding to the spectral auxiliary coefficient; and a storage unit configured to store, as an image file, a combination of the calculated fundamental stimulus value and the downscaled spectral auxiliary coefficient, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and in an image size corresponding to the spectral auxiliary coefficient, an image size corresponding to the second coefficient is smaller than an image size corresponding to the first coefficient.

Still yet another aspect of the present invention provides an image processing apparatus comprising: an input unit configured to input spectral information of an image; a calculation unit configured to calculate a fundamental stimulus value and a spectral auxiliary coefficient from the spectral information; a reduction unit configured to reduce a bit count of the spectral auxiliary coefficient; and a storage unit configured to store, as an image file, a combination of the calculated fundamental stimulus value and the reduced spectral auxiliary coefficient, wherein the spectral auxiliary coefficient corresponds to a spectral error generated when estimating spectral information from the fundamental stimulus value, and the bit count of the spectral auxiliary coefficient is smaller than a bit count of the fundamental stimulus value.

Yet still another aspect of the present invention provides an image processing apparatus comprising: an input unit configured to input spectral information of an image; a calculation unit configured to calculate a fundamental stimulus value and a spectral auxiliary coefficient from the spectral information; a reduction unit configured to reduce a bit count of the spectral auxiliary coefficient; and a storage unit configured to store, as an image file, a combination of the calculated fundamental stimulus value and the reduced spectral auxiliary coefficient, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and a bit count of the second coefficient is smaller than a bit count of the first coefficient.

Still yet another aspect of the present invention provides a method for image processing apparatus comprising the steps of: inputting image data which includes a fundamental stimulus value and a spectral auxiliary coefficient and represents an image; and performing an image processing for the image data, wherein the spectral auxiliary coefficient corresponds to a spectral error generated when estimating spectral information from the fundamental stimulus value, and an image size corresponding to the spectral auxiliary coefficient representing the image is smaller than an image size corresponding to the fundamental stimulus value representing the image.

Yet still another aspect of the present invention provides a method for image processing apparatus comprising the steps of: inputting image data which includes a fundamental stimulus value and a spectral auxiliary coefficient and represents an image; and performing an image processing for the image data, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and an image size corresponding to the second coefficient representing the image is smaller than an image size corresponding to the first coefficient representing the image.

Still yet another aspect of the present invention provides a method for image processing apparatus comprising the steps of: inputting image data which includes a fundamental stimulus value and a spectral auxiliary coefficient and represents an image; and performing an image processing for the image data, wherein the spectral auxiliary coefficient corresponds to a spectral error generated when estimating spectral information from the fundamental stimulus value, and a bit count of the spectral auxiliary coefficient is smaller than a bit count of the fundamental stimulus value.

Yet still another aspect of the present invention provides a method for image processing apparatus comprising the steps of: inputting image data which includes a fundamental stimulus value and a spectral auxiliary coefficient and represents an image; and performing an image processing for the image data, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and a bit count of the second coefficient is smaller than a bit count of the first coefficient.

Still yet another aspect of the present invention provides a method for image processing apparatus comprising the steps of: inputting spectral information of an image; calculating a fundamental stimulus value and a spectral auxiliary coefficient from the spectral information; downscaling an image size corresponding to the spectral auxiliary coefficient; and storing, as an image file, a combination of the calculated fundamental stimulus value and the downscaled spectral auxiliary coefficient, wherein the spectral auxiliary coefficient corresponds to a spectral error generated when estimating spectral information from the fundamental stimulus value, and an image size corresponding to the spectral auxiliary coefficient stored in the image file is smaller than an image size corresponding to the fundamental stimulus value stored in the image file.

Yet still another aspect of the present invention provides a method for image processing apparatus comprising the steps of: inputting spectral information of an image; calculating a fundamental stimulus value and a spectral auxiliary coefficient from the spectral information; downscaling an image size corresponding to the spectral auxiliary coefficient; and storing, as an image file, a combination of the calculated fundamental stimulus value and the downscaled spectral auxiliary coefficient, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and in an image size corresponding to the spectral auxiliary coefficient, an image size corresponding to the second coefficient is smaller than an image size corresponding to the first coefficient.

Still yet another aspect of the present invention provides a method for image processing apparatus comprising the steps of: inputting spectral information of an image; calculating a fundamental stimulus value and a spectral auxiliary coefficient from the spectral information; reducing a bit count of the spectral auxiliary coefficient; and storing, as an image file, a combination of the calculated fundamental stimulus value and the reduced spectral auxiliary coefficient, wherein the spectral auxiliary coefficient corresponds to a spectral error generated when estimating spectral information from the fundamental stimulus value, and the bit count of the spectral auxiliary coefficient is smaller than a bit count of the fundamental stimulus value.

Yet still another aspect of the present invention provides a method for image processing apparatus comprising the steps of: inputting spectral information of an image; calculating a fundamental stimulus value and a spectral auxiliary coefficient from the spectral information; reducing a bit count of the spectral auxiliary coefficient; and storing, as an image file, a combination of the calculated fundamental stimulus value and the reduced spectral auxiliary coefficient, wherein the spectral auxiliary coefficient corresponds to a spectral error generated when estimating spectral information from the fundamental stimulus value, the spectral auxiliary coefficient includes a first coefficient and a second coefficient having different degrees of influence on spectral information, and a bit count of the second coefficient is smaller than a bit count of the first coefficient.

Still yet another aspect of the present invention provides a computer-readable storage medium storing a program for implementing above-scribed an image processing apparatus by using a computer.

Further features of the present invention will be apparent from the following description of exemplary embodiments with reference to the attached drawings.

BRIEF DESCRIPTION OF DRAWINGS

FIG. 24 is a view showing an example of a user interface for designating the size of a spectral auxiliary image and the bit count per pixel.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Hardware Configuration of Image Processing Apparatus>

Figure 1:
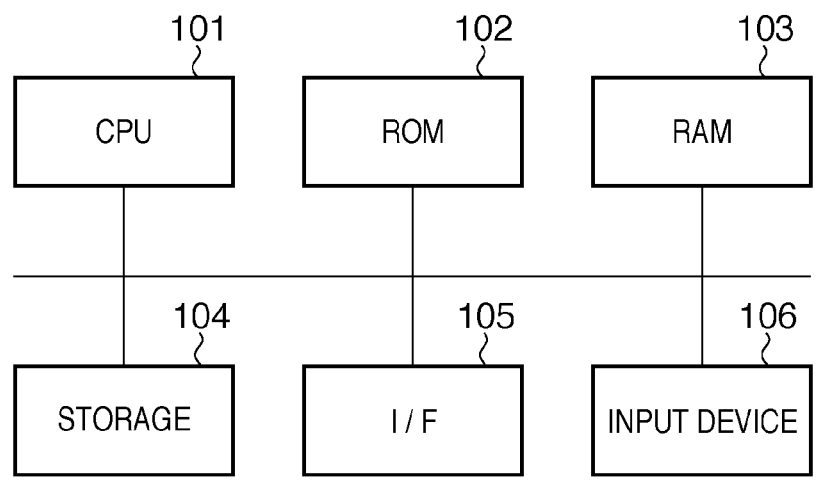
FIG. 1 is a block diagram showing the hardware configuration of an image processing apparatus according to the first embodiment.

FIG. 1 is a block diagram showing the hardware configuration of an image processing apparatus according to the first embodiment. A CPU 101 performs various control operations for implementing an image processing method according to the first embodiment in accordance with a control program stored in a ROM 102 or a control program loaded from a storage 104 to a RAM 103. The ROM 102 stores various parameters, control programs to be executed by the CPU 101, and the like. The RAM 103 provides a work area when executing various control operations by the CPU 101, and stores a control program executed by the CPU 101. The storage 104 is, for example, a hard disk, Floppy® disk, CD-ROM, DVD-ROM, or memory card. When the storage is a hard disk, it stores various programs installed from a CD-ROM, Floppy® disk, and the like, and various data (e.g., image data and a color conversion table) to be processed. An I/F 105 is connected to various image output apparatuses such as a color printing apparatus. An input device 106 includes various input devices such as a mouse and keyboard.

<Block Diagram of Arrangement of Image Processing Apparatus>

Figure 2:
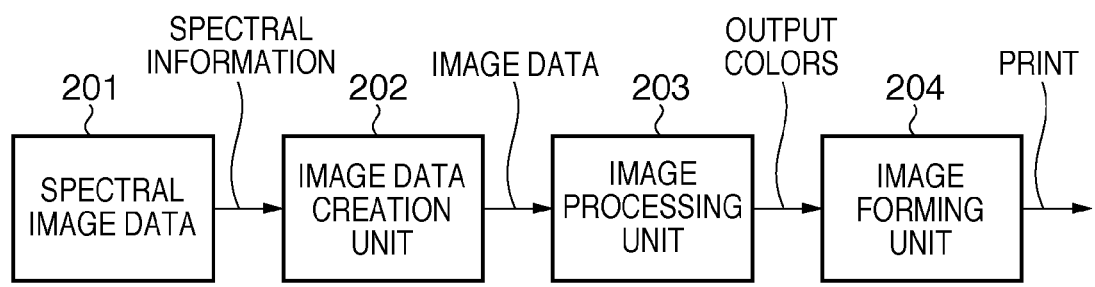
FIG. 2 is a block diagram showing the arrangement of the image processing apparatus according to the first embodiment.

FIG. 2 is a block diagram showing the arrangement of the image processing apparatus according to the first embodiment.

Input image data 201 is spectral image data formed from spectral information of each pixel. An image data creation unit 202 creates image data including fundamental stimulus values and spectral auxiliary coefficients from spectral information. The fundamental stimulus values are tristimulus values under a specific environment light source, such as CIELAB or CIEXYZ, or color values (e.g., R, G, and B) derived from them. The spectral auxiliary coefficients correspond to a spectral error generated when estimating spectral information from fundamental stimulus values. The spectral auxiliary coefficients are used to compensate for the spectral error. An image processing unit 203 calculates output colors from image data created by the image data creation unit. An image forming unit 204 forms an image by a color printing apparatus.

In the first embodiment, the CPU executes the processes of the image data creation unit and image processing unit. The image forming unit is a color printing apparatus connected via the I/F 105.

<Image Data Creation Unit>

Figure 3:
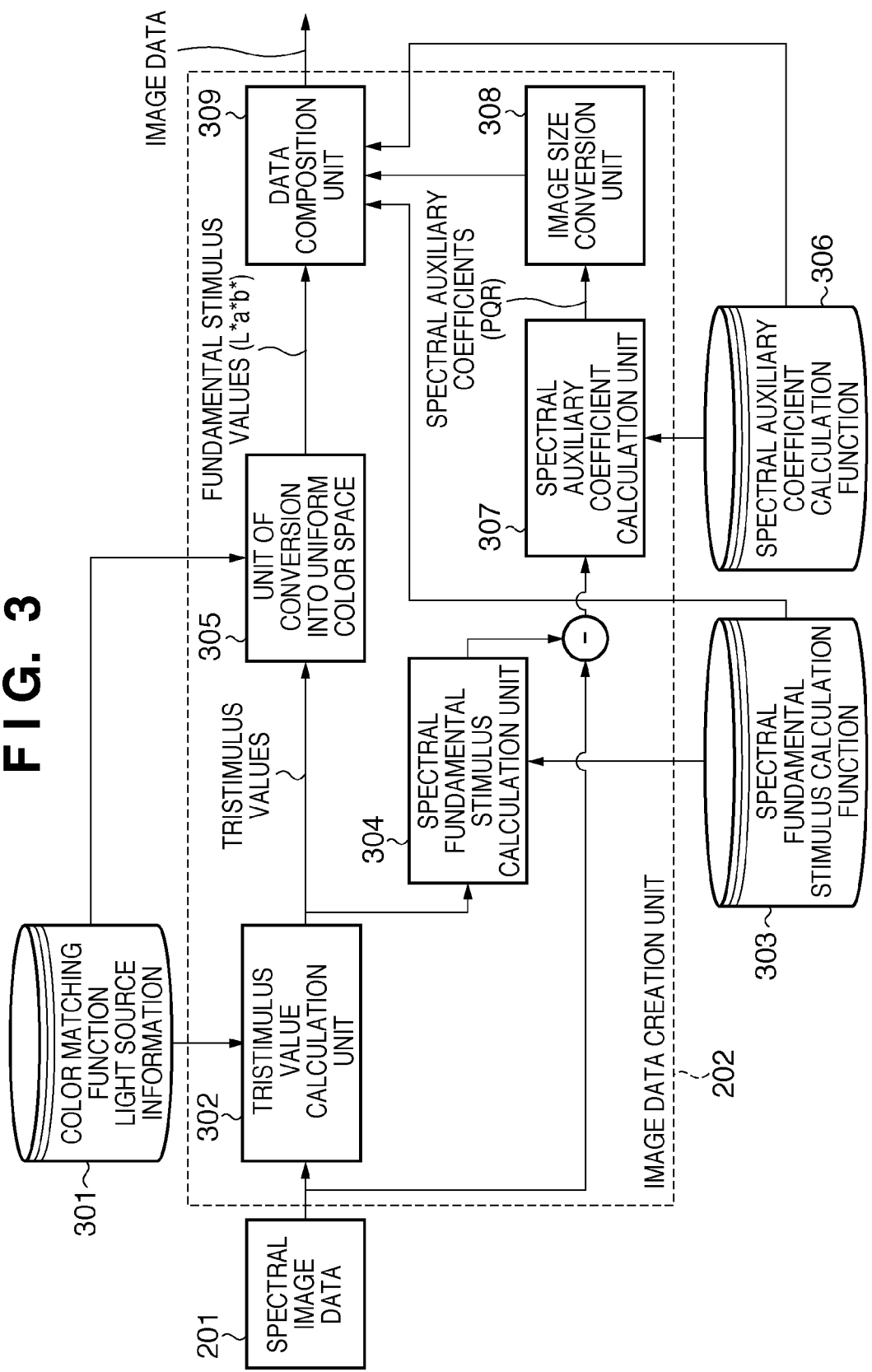
FIG. 3 is a block diagram showing the arrangement of an image data creation unit in FIG. 2 according to the first embodiment.
Figure 4:
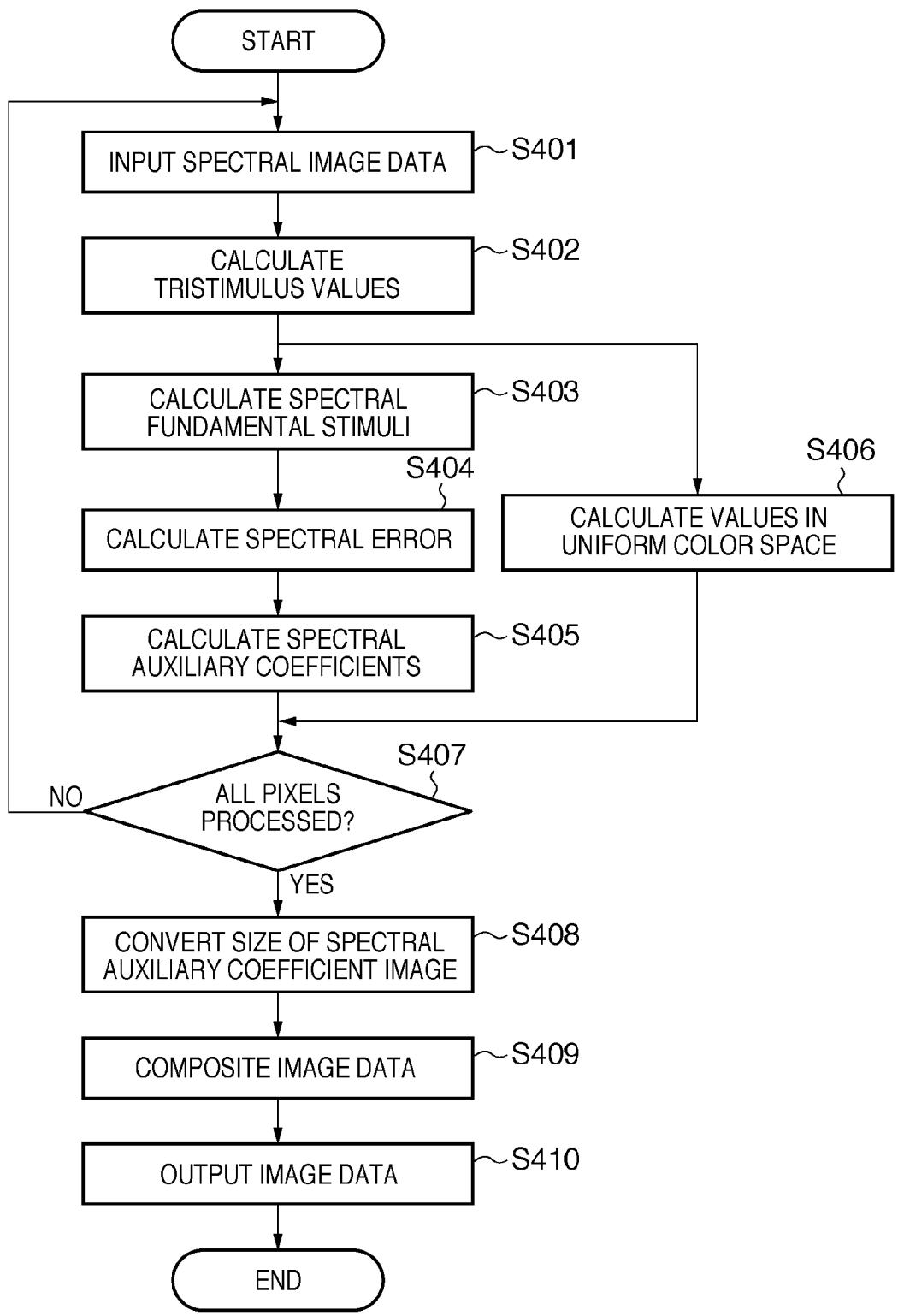
FIG. 4 is a flowchart showing the operation of the image data creation unit in FIG. 3.

FIG. 3 is a block diagram showing the arrangement of the image data creation unit 202. A memory 301 stores information of a CIE color matching function and observation light source. A tristimulus value calculation unit 302 calculates tristimulus values from spectral information by using information of the CIE color matching function and observation light source. A memory 303 stores a spectral fundamental stimulus calculation function used to calculate spectral fundamental stimuli from tristimulus values. A spectral fundamental stimulus calculation unit 304 calculates spectral basic stimuli from tristimulus values by using the spectral fundamental stimulus function. A conversion unit 305 converts tristimulus values into fundamental stimulus values (L*a*b*) in a uniform color space. A memory 306 stores a spectral fundamental stimulus calculation function used to calculate spectral auxiliary coefficients from the spectral errors between spectral fundamental stimulus values and the spectral image data 201. A spectral auxiliary coefficient calculation unit 307 calculates spectral auxiliary coefficients P, Q, AND R from spectral errors using the spectral auxiliary coefficient calculation function. An image size conversion unit 308 converts the size of an image (to be referred to as a spectral auxiliary image hereinafter) including a spectral auxiliary coefficient. A data composition unit 309 composites an image (to be referred to as a fundamental stimulus image hereinafter) including a fundamental stimulus value and a size-converted spectral auxiliary image. A process executed by the image data creation unit in FIG. 3 will be explained with reference to the flowchart of FIG. 4.

Figure 5:
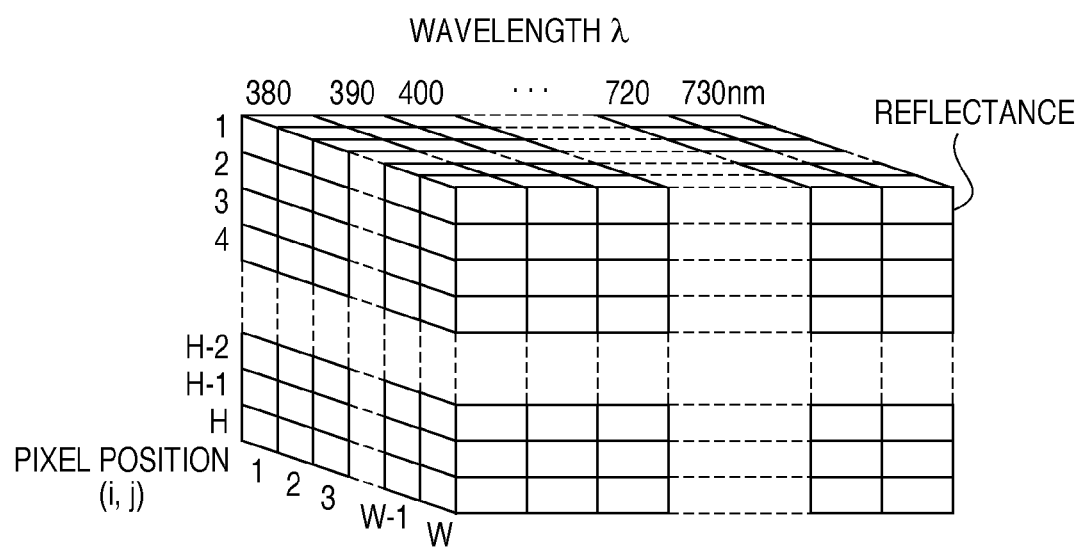
FIG. 5 is a view showing an example of a memory array which stores a spectral image.

First, spectral information R(i,j,λ) at each pixel of an input image is input (step S401). FIG. 5 shows an example of a memory array which stores input spectral image data. A spectral image used in the first embodiment has a lateral pixel count W and longitudinal pixel count H. Each pixel position stores a spectral reflectance obtained by dividing a visible light region having a wavelength λ of 380 nm to 730 nm at intervals of 10 nm. That is, each pixel has 36-dimensional spectral reflectance data, and the reflectance in each dimension varies between 0 and 1.

Then, the tristimulus value calculation unit 302 calculates tristimulus values CIEXYZ from the spectral reflectance at a pixel position (i,j) (step S402):

$$X(i, j) = k \sum_{\lambda=380}^{730} S(\lambda)R(i, j, \lambda)\bar{x}(\lambda)\Delta\lambda,$$

$$Y(i, j) = k \sum_{\lambda=380}^{730} S(\lambda)R(i, j, \lambda)\bar{y}(\lambda)\Delta\lambda,$$

$$Z(i, j) = k \sum_{\lambda=380}^{730} S(\lambda)R(i, j, \lambda)\bar{z}(\lambda)\Delta\lambda,$$

$$k = \frac{100}{\sum_{\lambda=380}^{730} S(\lambda)\bar{y}(\lambda)\Delta\lambda}$$

(1)

where $S(\lambda)$ is the spectral radiance of an environment light source. The first embodiment uses the CIE D50 light source as light source information.

Color matching functions are given by $$\bar{x}(\lambda), \bar{y}(\lambda), \text{ and } \bar{z}(\lambda)$$

(2)

The spectral fundamental stimulus calculation unit 304 calculates spectral basic stimuli from the tristimulus values (step S403):

$$N(i,j,\lambda) = T \times Nc(i,j),$$

$$Nc(i,j) = [X(i,j), Y(i,j), Z(i,j)]^T$$

where N is a 36×1 matrix representing spectral basic stimuli, and T is a 36×3 matrix representing the spectral fundamental stimulus calculation function 303. The spectral fundamental stimulus calculation function 303 is prepared in advance. Nc(i,j) is a 3×1 matrix formed from tristimulus values at the pixel position (i,j).

The superscript "T" on the right-hand side of the above-described equation means a transposed matrix. As is apparent from the above-described equation, the spectral fundamental stimulus calculation unit 304 calculates the same spectral basic stimuli for all combinations (metameric pairs) of spectral reflectances having the same tristimulus values Nc.

The spectral error between the spectral information R(i,j,λ) serving as input spectral image data and the spectral fundamental stimulus N(i,j,λ) is calculated (step S404):

$$B(i,j,\lambda)=R(i,j,\lambda)-N(i,j,\lambda)$$

The spectral auxiliary coefficient calculation unit 307 calculates a spectral auxiliary coefficient Np(i,j) at the pixel position (i,j) by using the spectral auxiliary coefficient calculation function 306 (step S405):

$$Np(i,j)=V^T \times B(i,j,\lambda)$$

where V is a 36×3 matrix representing a spectral auxiliary coefficient calculation function. In the first embodiment, the spectral auxiliary coefficient Np(i,j) is formed from three coefficients. These coefficients will be called PQR.

While the spectral auxiliary coefficients Np are calculated from the tristimulus values Nc calculated in step S402, the conversion unit 305 for conversion into a uniform color space calculates fundamental stimulus values in the uniform color space from the tristimulus values Nc (step S406). The first embodiment employs CIELAB as the uniform color space. The tristimulus values Nc are converted into L*, a*, and b* values:

$$L^*=116(f(Y/Yn)-16/116),$$

$$a^*=500(f(X/Xn)-f(Y/Yn)),$$

$$b^*=200(f(Y/Yn)-f(Z/Zn))$$

where the function f(x) is defined by $$f(x)=x^{(1/3)}(x>0.008856)$$

$$f(x)=7.787x+16/116 \ (x \leq 0.008856)$$

Xn, Yn, and Zn are the tristimulus values of reference white in light source information. The first embodiment uses the tristimulus values of reference white of the CIE D50 light source.

It is determined whether the spectral auxiliary coefficients Np and L*a*b* values have been calculated for all pixels (step S407). If an unprocessed pixel remains, the process returns to step S401 to repetitively execute steps S401 to S406.

If the spectral auxiliary coefficients Np and L*a*b* values have been calculated for all pixels, the size of the spectral auxiliary image is converted (resolution conversion) (step S408). The size conversion is done by an interpolation process by referring to spectral auxiliary coefficients Np near a target position (ii,jj). For example, the size of the spectral auxiliary image is downscaled to a lateral pixel count 2W/3 and longitudinal pixel count 2H/3 by a linear interpolation process:

$$Np'(ii,jj)=(Np(1.5 \times ii,1.5 \times jj)+Np(1.5 \times ii+1,1.5 \times jj)+Np(1.5 \times ii,1.5 \times jj+1)+Np(1.5 \times ii+1,1.5 \times jj+1))/4$$

where ii and jj are integers which satisfy $$0 \leq ii < 2H/3-1, 0 \leq jj < 2W/3-1$$

Figure 6:
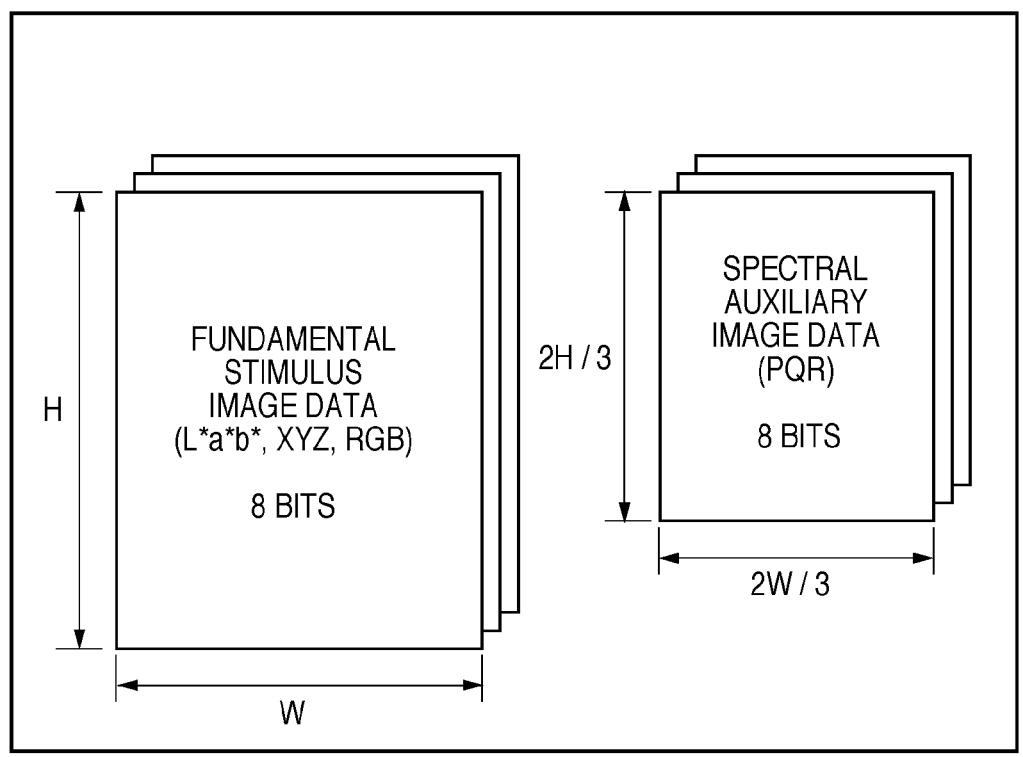
FIG. 6 is a view showing an example of image data according to the first embodiment.

FIG. 6 shows an example of fundamental stimulus image data and a size-converted spectral auxiliary image. The first embodiment executes the same interpolation process for all spectral auxiliary image data (P image data, Q image data, and R image data). Thus, the data capacity necessary for each spectral auxiliary image can be reduced to 4/9 of one before size conversion. In this manner, the first embodiment converts the size of a spectral auxiliary image, but does not convert the size of a fundamental stimulus image.

Finally, the size-converted spectral auxiliary image data Np' and fundamental stimulus image data are composited (step S409), and the composited image data is output as image data together with the spectral auxiliary function (step S410). The spectral auxiliary function is used to reconstruct spectral information from fundamental stimulus image data and spectral auxiliary image data. More specifically, the spectral fundamental stimulus calculation function 303 and spectral auxiliary coefficient calculation function 306 correspond to the spectral auxiliary function.

By the above-described process, image data is created.

<Structure of Image Data>

Figure 7:
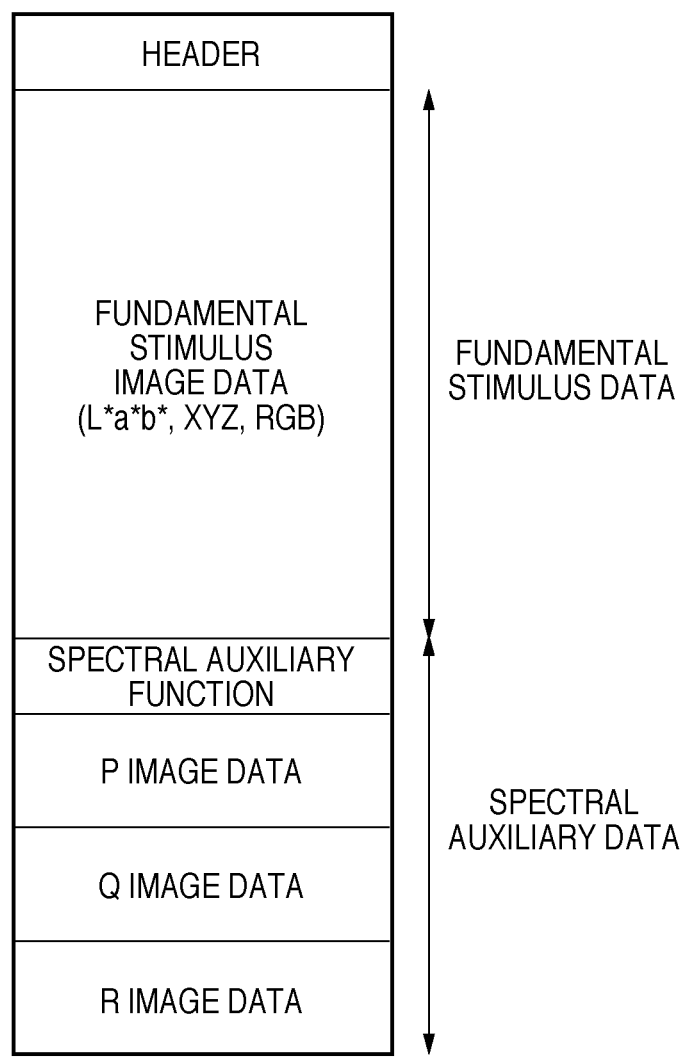
FIG. 7 is a view showing an example of a memory array which stores image data.

FIG. 7 shows an example of the structure of an image file which stores image data. A header is stored at the start of image data to describe the image size, the bit count per pixel, and the like. Fundamental stimulus image data, a spectral auxiliary function, and spectral auxiliary image data are stored subsequently to the header. The spectral auxiliary image data stores size-converted P image data, Q image data, and R image data in order.

A memory capacity (bytes) necessary to store image data having this structure can be calculated by $$SIZE=SIZE\_Nc+SIZE\_Np'+SIZE\_F$$

where SIZE_Nc is the data capacity of a fundamental stimulus image, SIZE_Np' is that of spectral auxiliary image data, and SIZE_F is that of a spectral auxiliary function. The respective data capacities are defined by $$SIZE\_Nc=W \times H \times Byte\_Nc \times 3$$

$$SIZE\_Np'=W' \times H' \times Byte\_Np \times Nb$$

$$SIZE\_F=Nw \times (Byte\_Nt \times 3+Byte\_Nv \times Nb)$$

where W' and H' are the lateral and longitudinal pixel counts of a size-converted spectral auxiliary coefficient image, Byte_Nc is the byte count of fundamental stimulus data per pixel (the byte count of each of L*, a*, and b* values), Byte_Np is the byte count of spectral auxiliary image data (the byte count of each of PQR values), Nb is the number of dimensions of spectral auxiliary image data, Byte_Nt is the byte count of each value of the spectral fundamental stimulus calculation function, Byte_Nv is the byte count of each value of the spectral auxiliary coefficient calculation function, and Nw is the number of dimensions of the spectral auxiliary function in the wavelength direction. As described above, in the first embodiment, Nb=3, and Nw=36.

For example, letting W=1,280 pixels and H=1,024 pixels be the lateral and longitudinal sizes of fundamental stimulus image data, W'=853 pixels and H'=683 pixels be the lateral and longitudinal sizes of spectral auxiliary image data, Byte_Nc=1 and Byte_Np=1 be the byte counts of respective values of the fundamental stimulus data and spectral auxiliary image data, and Byte_Nt=1 and Byte_Nv=1 be the byte counts of respective values of the spectral auxiliary function, $$SIZE\_Nc=1280 \times 1024 \times 1 \times 3=3,932,160 \text{ bytes (about 3.75 Mbytes)}$$

$$SIZE\_Np'=853 \times 683 \times 1 \times 3=1,747,797 \text{ bytes (about 1.67 Mbytes)}$$

$$SIZE\_F=36 \times (1 \times 3+1 \times 3)=216 \text{ bytes}$$

The total data capacity SIZE of image data is given by the sum of the byte counts, and is about 5.41 Mbytes.

If the size of an image corresponding to a spectral auxiliary coefficient is not converted, the image sizes of spectral auxiliary image data are W'=W=1280 and H'=H=1024. The data capacity SIZE_Np' of the spectral auxiliary image is about 3.75 Mbytes, which is larger by 2.08 Mbytes than the data capacity of a size-converted image. It is confirmed that the data capacity can be reduced by this increase by size conversion of spectral auxiliary image data.

<Spectral Fundamental stimulus Calculation Function and Spectral Auxiliary Coefficient Calculation Function>

Figure 8:
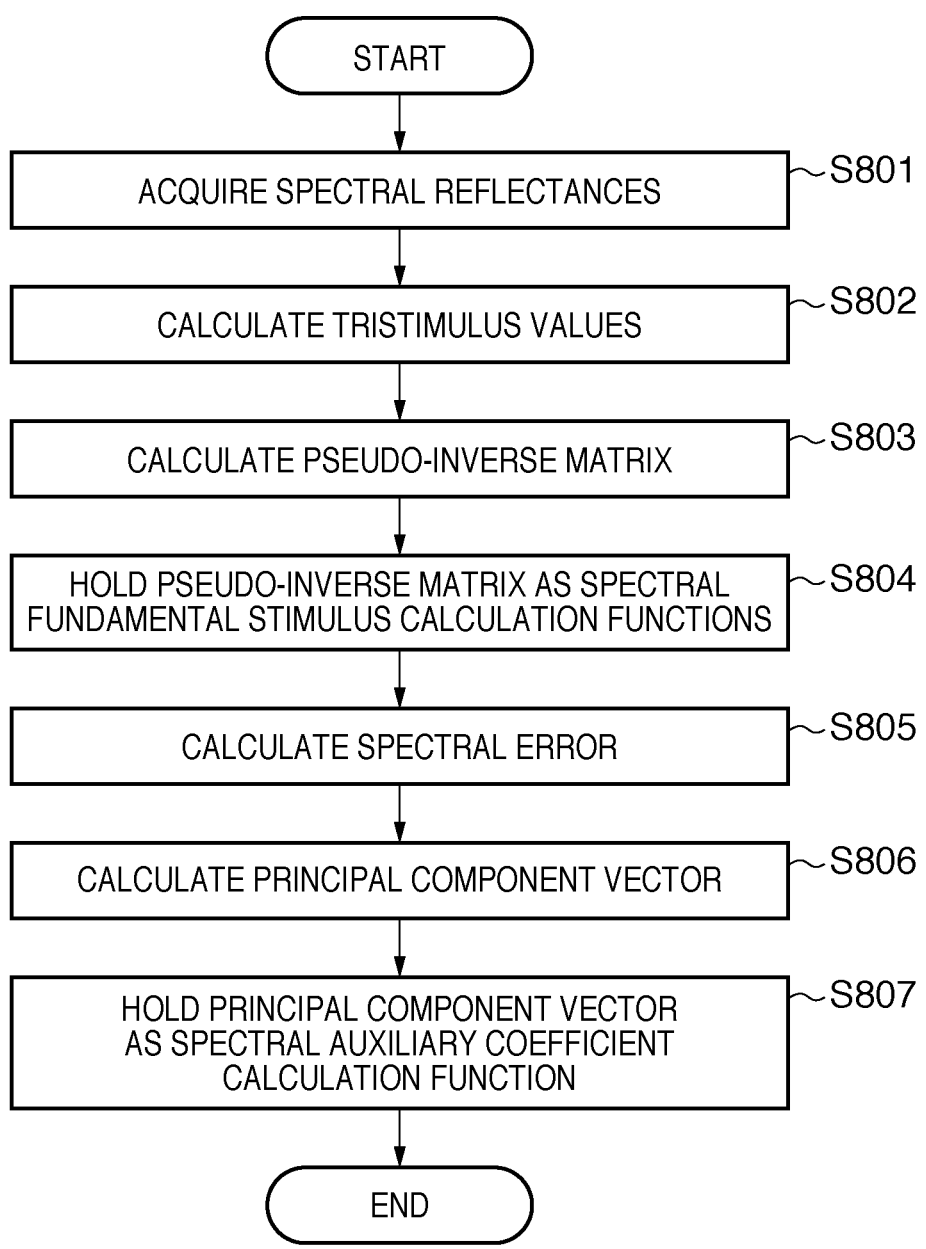
FIG. 8 is a flowchart showing a method of determining a spectral fundamental stimulus calculation function and spectral auxiliary coefficient calculation function in FIG. 3.

A method of determining the spectral fundamental stimulus calculation function 303 and spectral auxiliary coefficient calculation function 306 will be explained with reference to the flowchart of FIG. 8.

When determining the spectral fundamental stimulus calculation function 303 and spectral auxiliary coefficient calculation function 306, a data group including the spectral reflectances of a plurality of sample colors is prepared (step S801).

The first embodiment adopts, as sample colors, print patches of 729 different colors which are formed by the image forming unit 204 and distributed at random in the CIELAB space. Note that patches are color chips forming a uniform color distribution. As spectral reflectance data, ones obtained by measuring these patches are used.

The sample colors are not limited to them as long as data are distributed in a color space. For example, ColorChecker, ColorCheckerDC, or Munsell Book of Color available from GretagMacbeth can be used.

Tristimulus values Nc are calculated from the input spectral reflectance of each print patch (step S802). A method of calculating Nc from the spectral reflectance has been described above.

A pseudo-inverse matrix for estimating the spectral reflectance of an input is calculated from the tristimulus values (step S803), and held as a spectral fundamental stimulus calculation function T (step S804):

$$T = R \times pinv(Nc)$$

Figure 9:
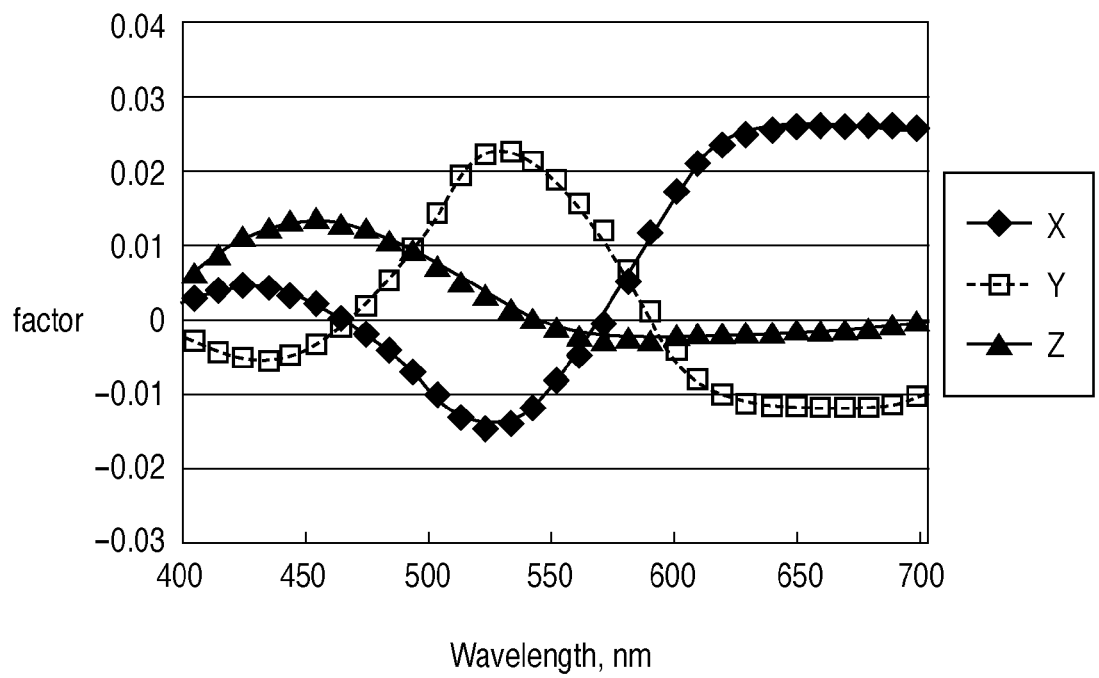
FIG. 9 is a graph showing a spectral fundamental stimulus calculation function derived from print patches of 729 colors.

R in the first embodiment is a 36×729 matrix which is formed from spectral reflectances and stores spectral reflectances in the row direction. Similarly, Nc in the first embodiment is a 3×729 matrix formed from tristimulus values. pinv( ) is a function of calculating the pseudo-inverse matrix of an input matrix. FIG. 9 is a graph obtained by plotting coefficients corresponding to the wavelengths of the matrix T derived from the print patches of 729 colors.

The spectral fundamental stimulus calculation function T and tristimulus values Nc can be used to estimate the spectral reflectance of an input:

$$N = T \times Nc$$

wherein N is the above-mentioned spectral fundamental stimulus.

However, the spectral reflectance is uniquely determined for a set of tristimulus values Nc, as described above. The above-described equation cannot implement spectral estimation capable of identifying a metameric pair.

Identification of a metameric pair newly requires an auxiliary index including spectral information in addition to tristimulus values. Thus, the spectral error between the input spectral information R and the spectral fundamental stimulus T is calculated (step S805):

$$B = R - N$$

The matrix B stores all the spectral errors of the print patches of 729 colors, and has a matrix size of 36×729.

Figure 10:
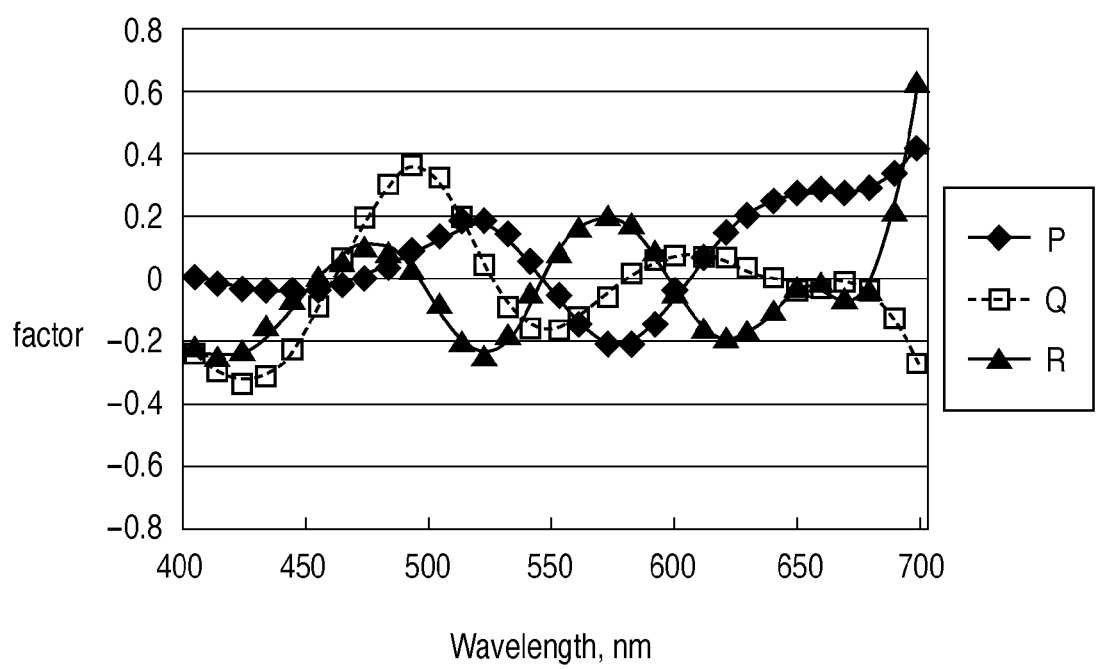
FIG. 10 is a graph showing a spectral auxiliary coefficient calculation function derived from print patches.

Then, a principal component vector vi of the spectral error matrix B is calculated (step S806). The first to third, low-order principal component vectors are held as a spectral auxiliary calculation function V (step S807):

$$V = (v1, v2, v3)$$

where v1 is the first principal component vector, v2 is the second principal component vector, and v3 is the third principal component vector. Each principal component vector has a size of 36×1. FIG. 10 is a graph obtained by plotting coefficients corresponding to the respective wavelengths of the matrix V derived from sample colors.

Calculation of a principal component vector will be explained. First, the covariance matrix of the spectral error matrix B is calculated by $$W = B \times BT$$

Then, an eigenvalue λi and eigenvector vi (i is the number of dimensions of a vector) of the covariance matrix are obtained by solving $$W \times vi = \lambda i \times vi$$

The eigenvector is handled as a spectral auxiliary coefficient calculation function.

By the above-described process, the spectral fundamental stimulus calculation function T and spectral auxiliary calculation function V are determined.

A spectral auxiliary coefficient corresponding to a spectral error can be calculated using the calculated spectral fundamental stimulus calculation function T. The spectral auxiliary coefficient can be used to obtain a spectral difference even for a metameric pair of which are considered to be the identical stimulus value in conventional colorimetric color reproduction. The image data creation unit 202 performs the process to derive the tristimulus values Nc and spectral auxiliary coefficients Np from the spectral reflectance. The spectral reflectance can also be reconstructed from the tristimulus values Nc and spectral auxiliary coefficients Np. A transformation used for spectral reconstruction is $$R' = N + B$$
$$= T \times Nc + V \times NpR'$$

which represents a reconstructed spectral reflectance. The second term of the right-hand side of the transformation represents a spectral difference in a metameric pair.

Figure 11:
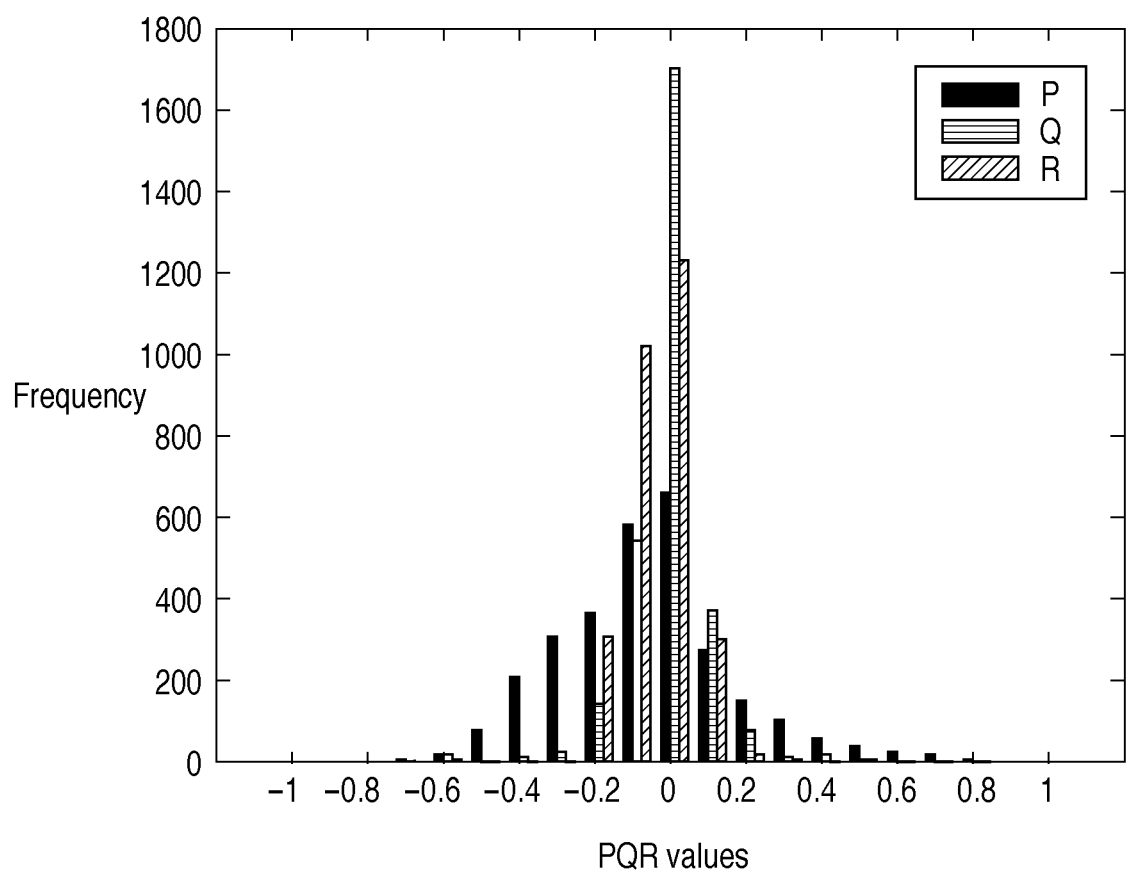
FIG. 11 is a histogram of PQR values derived from the spectral fundamental stimulus calculation function and spectral auxiliary calculation function calculated from print patches.

FIG. 11 is a histogram of the spectral auxiliary coefficients Np, that is, PQR values of sample colors calculated based on the spectral fundamental stimulus calculation function T and spectral auxiliary calculation function V. PQR are weighting factors for the first, second, and third principal component vectors, respectively. In addition to the print patches of 729 colors, the histogram shown in FIG. 11 includes the spectral reflectances of ColorChecker (24 colors), ColorCheckerDC (240 colors), and Munsell Book of Color Glossy Collection (1,600 colors) available from GretagMacbeth, pigment print patches (120 colors), and the spectral reflectances (170 colors) of objects including key colors in the natural world, such as the human skin color, the colors of plants, and the color of the sky. That is, this histogram is considered to include the spectral reflectances of typical objects. The histogram reveals that the variation ranges of the PQR values are P>Q>R. This characteristic appears because the first principal component vector v1 corresponding to the P value is set in a direction in which the variance is the largest in the dispersion range of the spectral error. The Q and R values correspond to the second and third principal component vectors v2 and v3, respectively. For this reason, the variation ranges of the PQR values are P>Q>R. A color conversion table used in the image processing unit 203 is made by paying attention to the characteristics of the PQR values, which will be described in detail later.

<Image Processing Unit>

Figure 12:
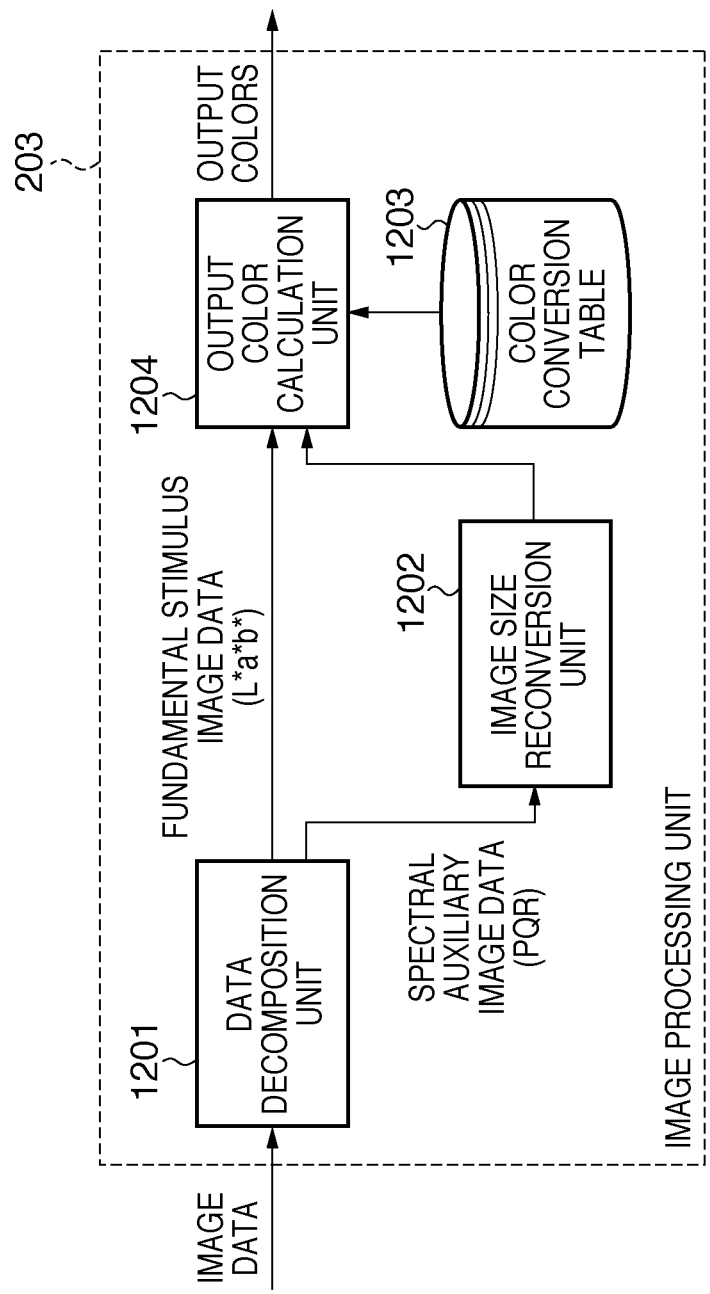
FIG. 12 is a block diagram showing the arrangement of an image processing unit in FIG. 2 according to the first embodiment.

FIG. 12 is a block diagram showing the arrangement of the image processing unit 203. A data decomposition unit 1201 decomposites image data into fundamental stimulus image data (L*a*b* values) and spectral auxiliary image data (PQR values). An image size reconversion unit 1202 converts again spectral auxiliary image data size-converted by the image size conversion unit 308 into an original image size. The reconversion of the image size makes the longitudinal and lateral pixel counts of spectral auxiliary image data equal to those of fundamental stimulus image data. A color conversion table 1203 represents the relationship between fundamental stimulus and spectral auxiliary data and the output colors of the image forming unit 204. An output color calculation unit 1204 determines the output colors of the basic image forming unit by looking up the color conversion table 1203. More specifically, the output color calculation unit 1204 determines output colors by a multidimensional interpolation process using output colors stored at grid points near a target point in the color conversion table. The multidimensional interpolation process is, for example, cubic interpolation or tetrahedral interpolation.

The color conversion table 1203 is formed from the above-mentioned LabPQR spectral space, and the number of dimensions is six. The number of grids in the L*a*b* space is 17×17×17. The grids are uniformly sampled along the respective axes:

L*=0, 6.25, 12.5, . . . , 93.75, 100,
a*=−128, −112, −96, . . . , 112, 128,
b*=−128, −112, −96, . . . , 112, 128

Grid points are set in the PQR space by referring to the histogram of PQR values in FIG. 11, and uniformly sampled along the respective axes:

P=−1.2, −1.0, . . . , 1.0, 1.2,
Q=−0.8, −0.6, . . . , 0.6, 0.8,
R=−0.6, −0.4, . . . , 0.4, 0.6,

Hence, the number of grid points in the PQR space is 13×9×7.

Figure 13:
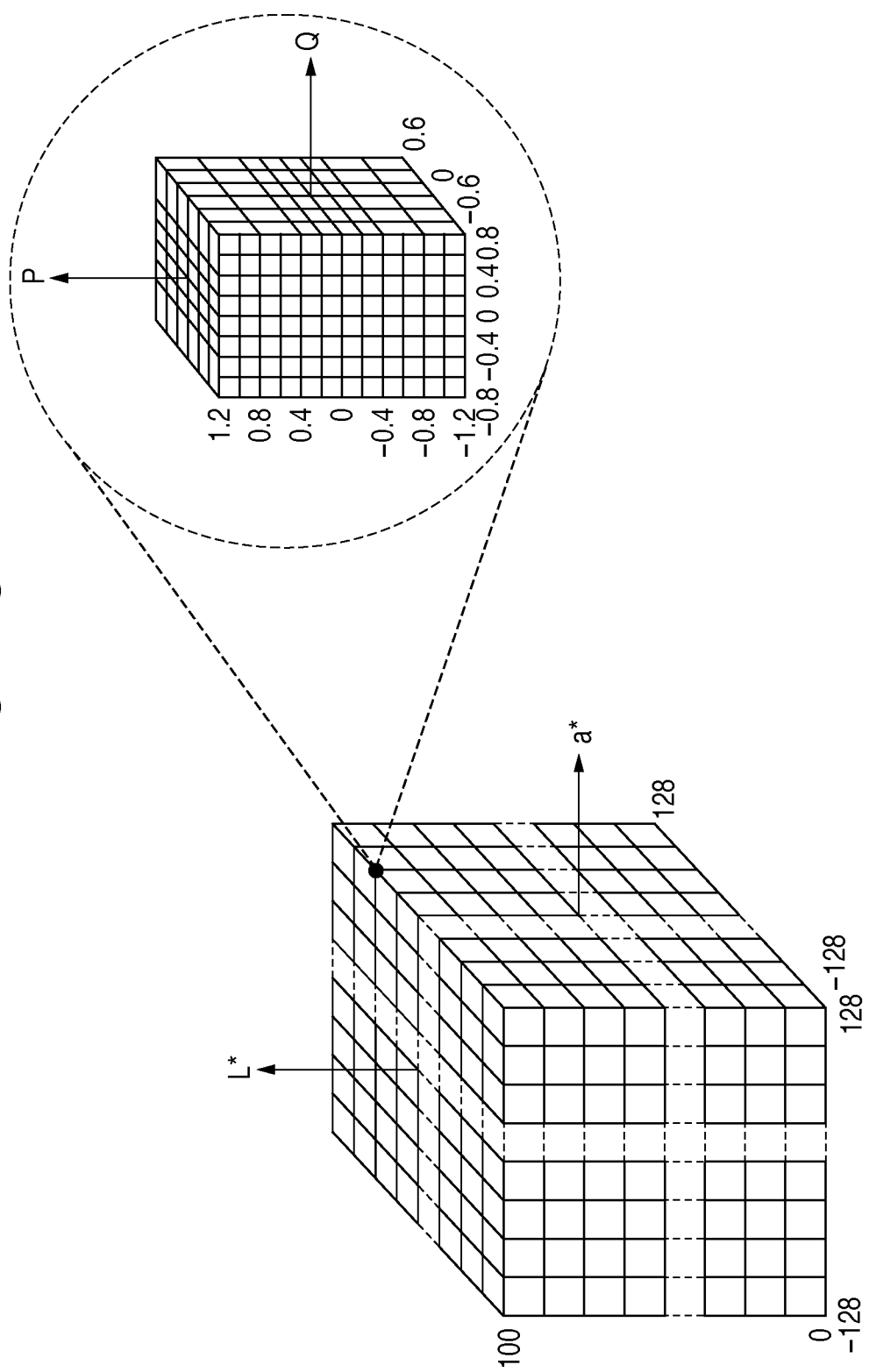
FIG. 13 is a view showing an example of a 6D color conversion table.

FIG. 13 shows an example of a color conversion table formed by uniform sampling. In practice, the color conversion table is a six-dimensional color conversion table, but it is divisionally illustrated as two, three-dimensional color conversion tables for descriptive convenience. Each grid point in the CIELAB space holds a color conversion table corresponding to a unique PQR space.

As described above, according to the first embodiment, an output image capable of reducing metamerism can be obtained by determining output colors using multidimensional image data based on the multidimensional spectral space LabPQR. To prevent an increase in data capacity that is inevitable in creating multidimensional image data, a spectral auxiliary image is downsized from a fundamental stimulus image. As a result, an image processing which does not decrease the color reproduction precision can be achieved.

Second Embodiment

In the first embodiment, the image sizes corresponding to the spectral auxiliary coefficients (PQR values) after image size conversion are equal to each other for all PQR images. In the second embodiment, the sizes of the spectral auxiliary images are converted in consideration of the degree of influence on spectral information.

Figure 14:
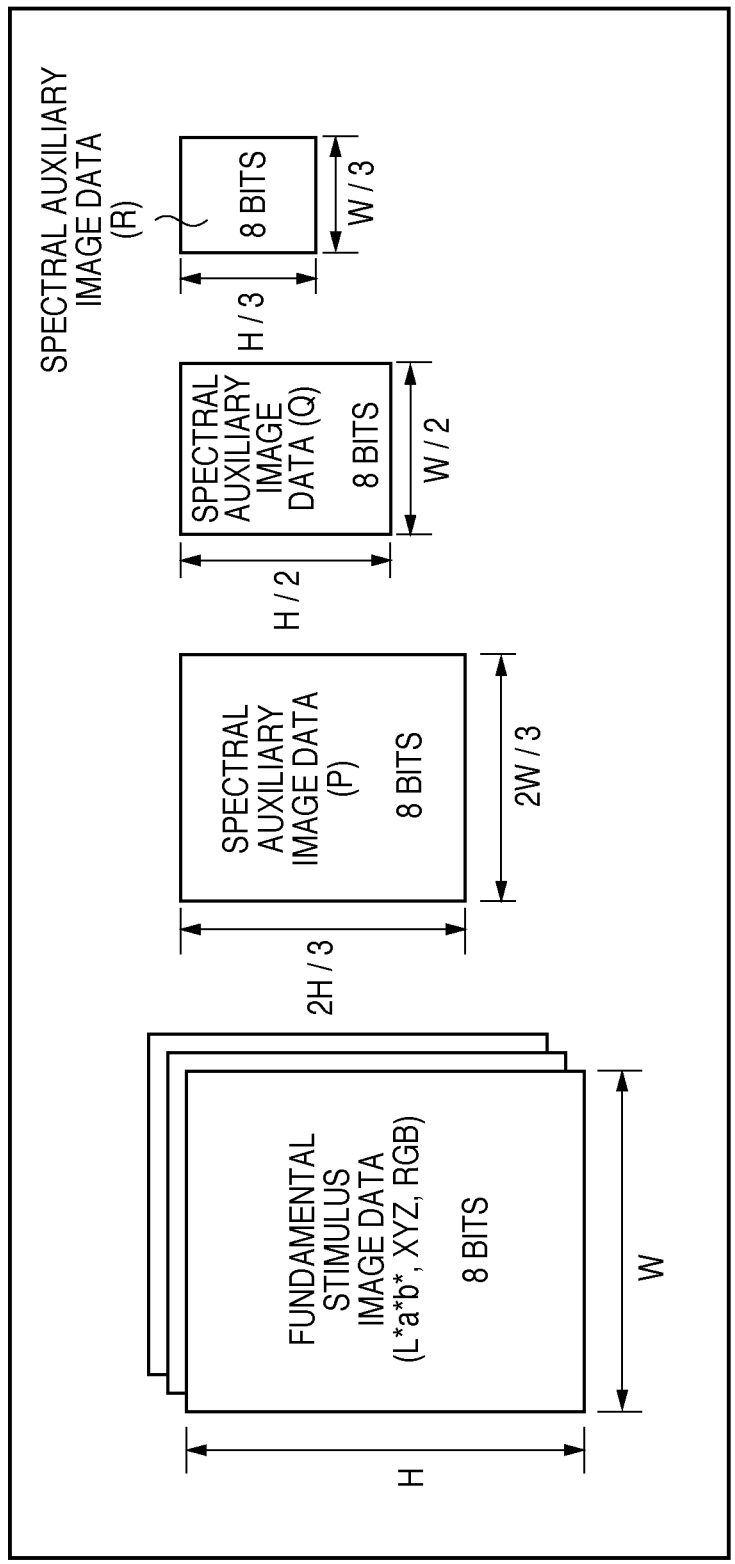
FIG. 14 is a view showing an example of image data according to the second embodiment.

FIG. 14 shows an example of size-converted spectral auxiliary images. In the second embodiment, the converted sizes of spectral auxiliary image data (P image data, Q image data, and R image data) satisfy P>Q>R. As described above, the P image is a spectral auxiliary image which most influences spectral information, the Q image is a spectral auxiliary image which second most influences it, and the R image is a spectral auxiliary image which least influences it.

From this, in the second embodiment, the data capacity necessary for each spectral auxiliary image is reduced to 4/9 of that before size conversion for the P image, 1/4 for the Q image, and 1/9 for the R image, as shown in FIG. 14. This size conversion is merely an example, and the amount of reduction is arbitrary as long as P>Q>R holds.

At this time, the data capacity of a spectral auxiliary image can be given by $$\text{SIZE}\_Np' = (Wp' \times Hp' + Wq' \times Hq' + Wr' \times Hr') \times \text{Byte}\_Np$$

where Wp' and Hp' are the lateral and longitudinal pixel counts of a size-converted P image, Wq' and Hq' are those of a size-converted Q image, and Wr' and Hr' are those of a size-converted R image. In the second embodiment, similar to the first embodiment, letting W=1,280 pixels and H=1,024 pixels be the sizes of a fundamental stimulus image, and Byte_Np=1 be the byte count of spectral auxiliary image data (the byte count of each of PQR values), the data capacity of a size-converted spectral auxiliary image is given by $$\text{SIZE}\_Np' = ((2H/3 \times 2W/3) + (H/2 \times W/2) + (H/3 \times W/3)) \times 1 = (4/9 + 1/4 + 1/9) \times 1280 \times 1024 = 1{,}055{,}858 \text{ bytes}$$
(about 1.01 Mbytes)

In the first embodiment, the data capacity of a spectral auxiliary image is about 1.67 Mbytes. In the second embodiment, the data capacity can be further reduced by about 0.66 Mbytes. As described above, according to the second embodiment, the image size corresponding to the spectral auxiliary coefficient changes stepwise in consideration of the degree of influence on spectral information. The second embodiment can further reduce the image data capacity while suppressing a decrease in color reproduction precision.

Third Embodiment

In the first and second embodiments, the data capacities per pixel of spectral auxiliary coefficients (PQR values) are equal to the capacities of fundamental stimulus values (L*a*b* values) for all PQR images. In the third embodiment, the bit count per pixel of the spectral auxiliary coefficient is smaller than the bit count of the fundamental stimulus value.

Figure 15:
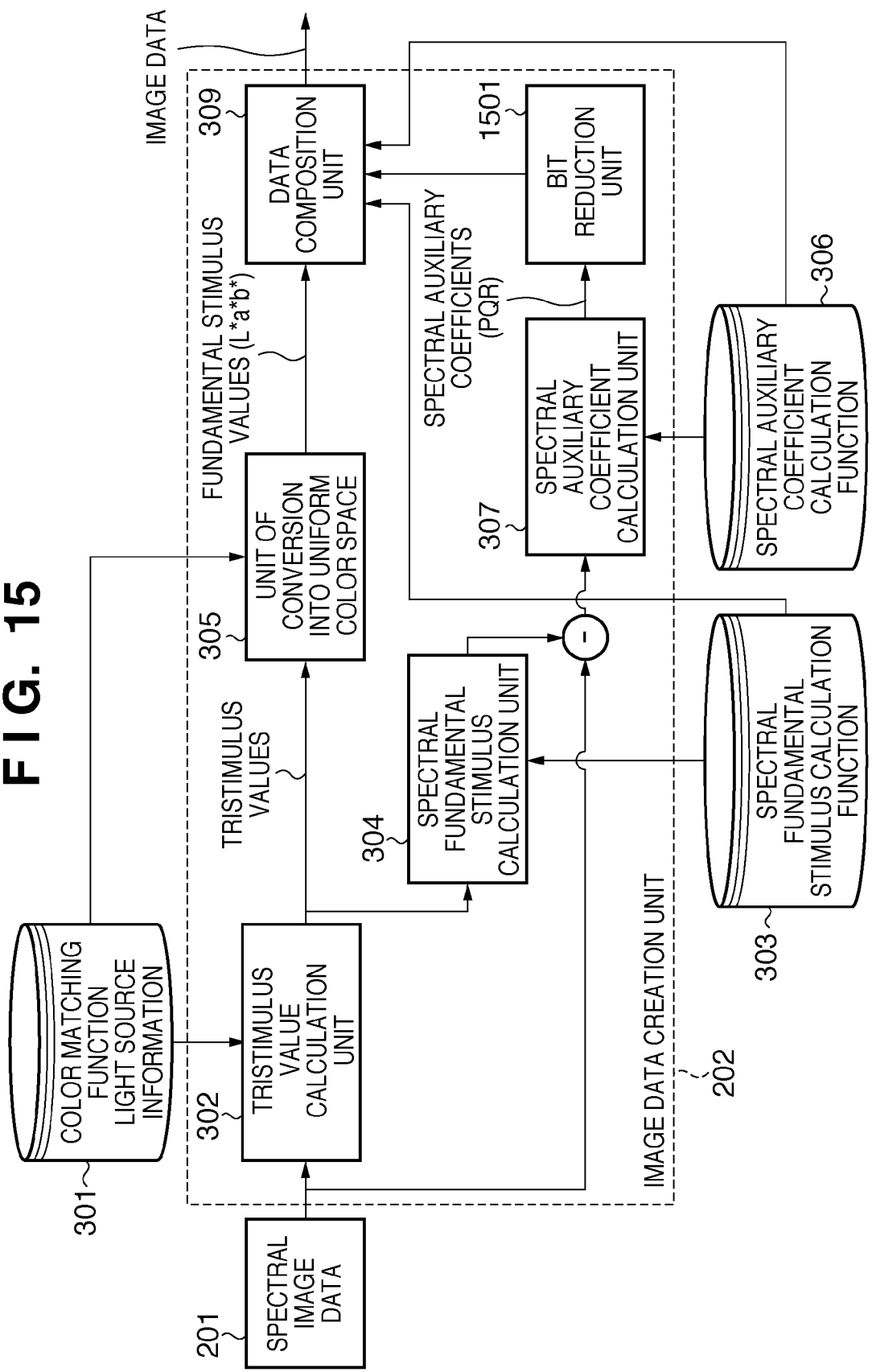
FIG. 15 is a block diagram showing the arrangement of an image data creation unit in FIG. 2 according to the third embodiment.

FIG. 15 is a block diagram showing the arrangement of an image data creation unit 202 in the third embodiment. The image data creation unit 202 is configured by deleting the image size conversion unit 308 from the image data creation unit of FIG. 3, and adding a bit reduction unit 1501.

Figure 16:
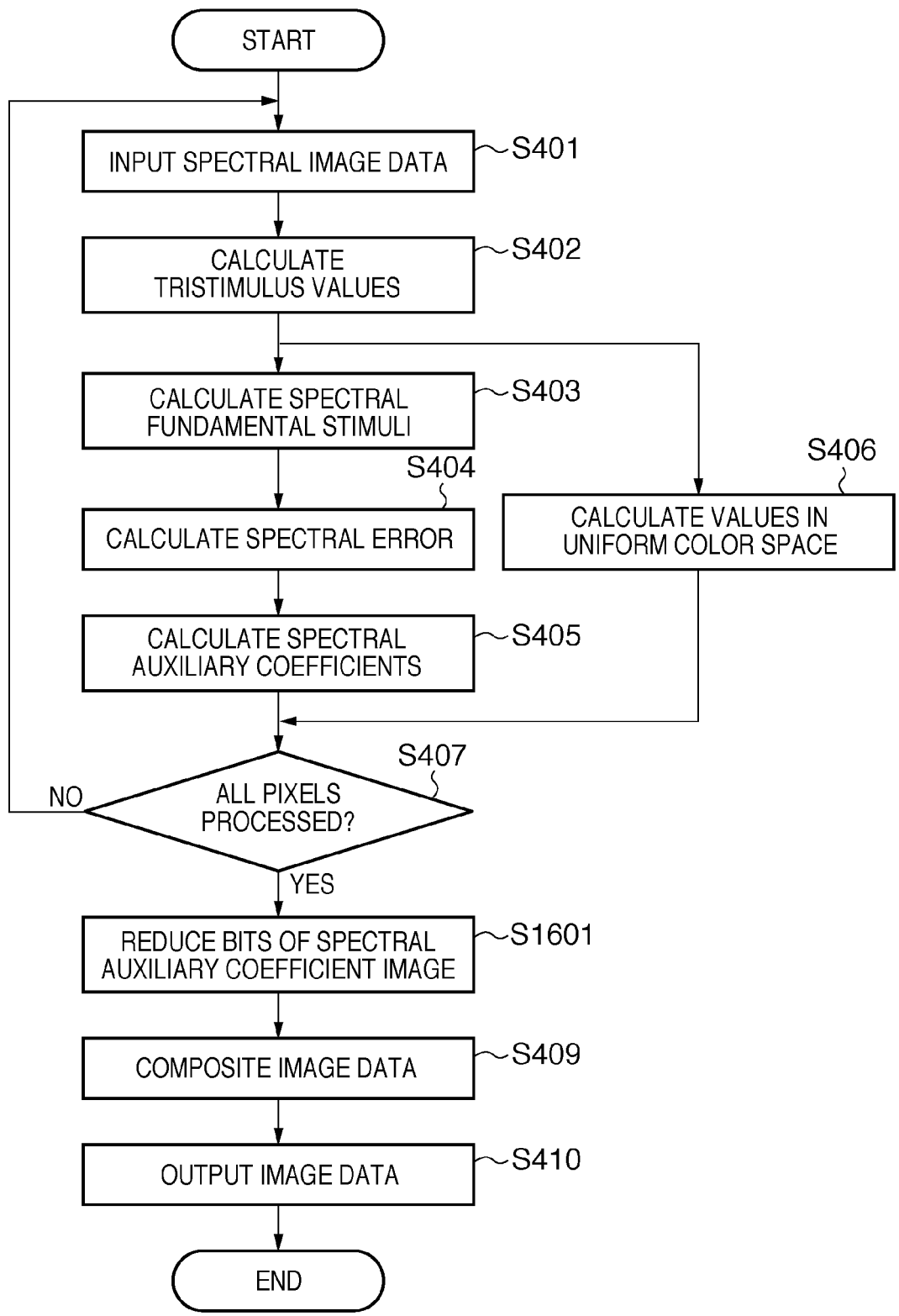
FIG. 16 is a flowchart showing the operation of the image data creation unit in FIG. 15.

FIG. 16 is a flowchart for explaining the operation of the image data creation unit in FIG. 15. This flowchart is obtained by deleting size conversion (step S408) of a spectral auxiliary coefficient image from the flowchart of the image data creation unit in FIG. 4, and adding bit reduction (step S1601) of a spectral auxiliary coefficient image.

The bits of a spectral auxiliary coefficient image are reduced by a spectral auxiliary coefficient Bit_Np' after bit reduction:

$$Bit\_Np' = Bit\_Np >> S$$

where Bit_Np is the bit count of a spectral auxiliary coefficient before bit reduction, S is the amount of bit reduction of the spectral auxiliary coefficient, and >> is a sign representing bit shift to the right.

Figure 17:
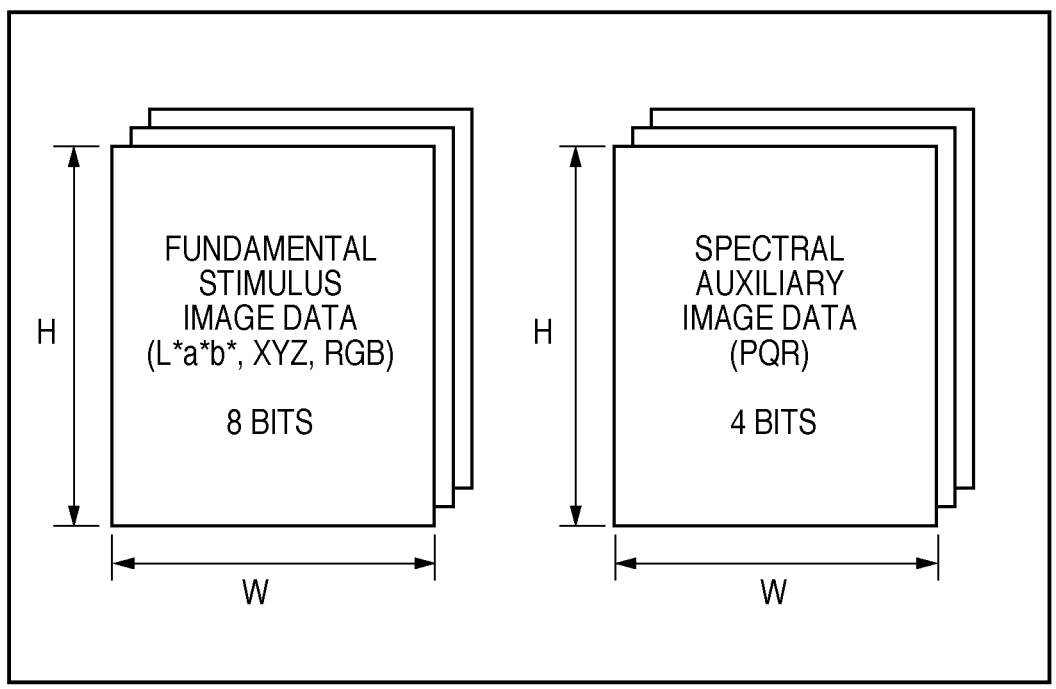
FIG. 17 is a view showing an example of image data according to the third embodiment.

FIG. 17 shows an example of spectral auxiliary images after reducing the bit count. In the third embodiment, the bit count of spectral auxiliary image data after bit reduction is 4. At this time, the data capacity (byte count) of a spectral auxiliary image can be given by $$SIZE\_Np' = W \times H \times Bit\_Np' \times 3/8$$

Letting W=1280 and H=1024 be image sizes,

SIZE_Np'=1280×1024×4×3/8=1,966,080 bytes (about 1.88 Mbytes). If no bit reduction is done, the same data capacity as that of fundamental stimulus data is necessary. Since this capacity is about 3.75 Mbytes, the data capacity necessary for spectral auxiliary image data can be halved.

Figure 18:
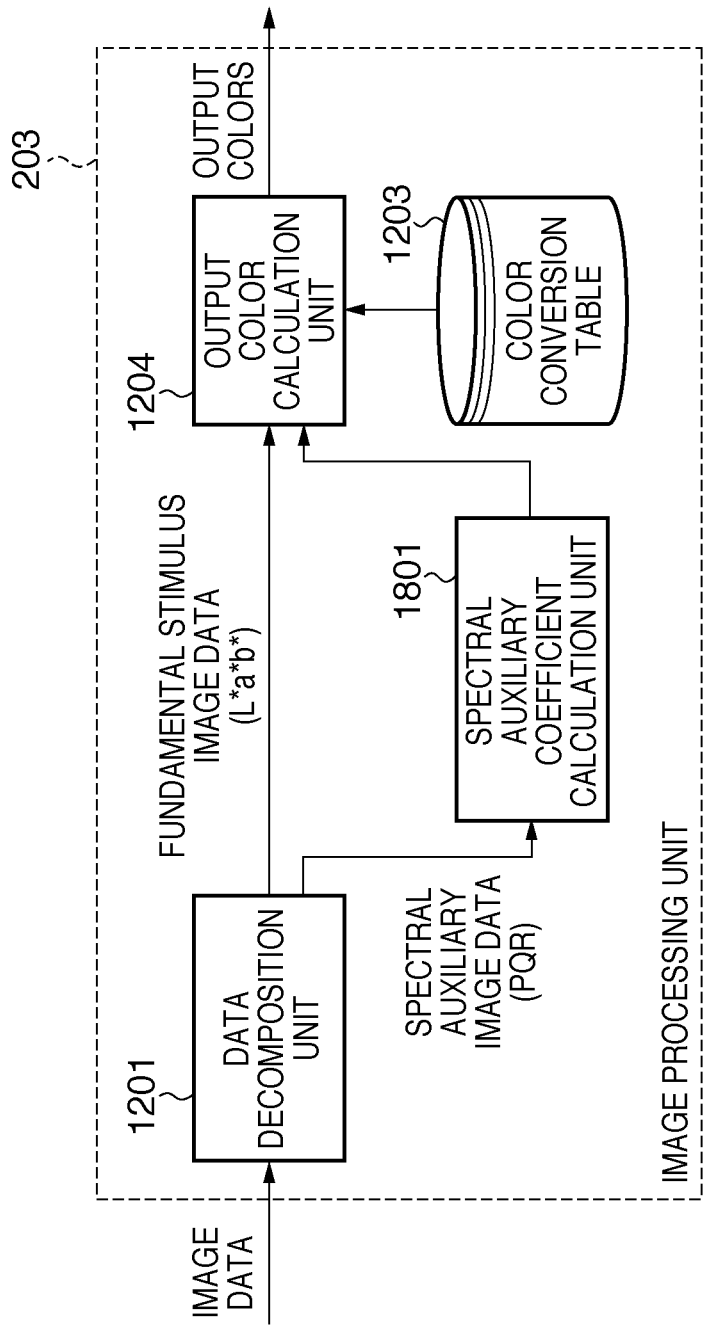
FIG. 18 is a block diagram showing the arrangement of an image processing unit in FIG. 2 according to the third embodiment.

FIG. 18 is a block diagram showing the arrangement of an image processing unit 203 in the third embodiment. The image processing unit 203 is configured by deleting the image size reconversion unit 1202 from the block diagram of FIG. 12, and adding a spectral auxiliary coefficient calculation unit 1801.

The spectral auxiliary coefficient calculation unit 1801 calculates again a spectral auxiliary coefficient from data reduced by the bit reduction unit 1501:

$$Bit\_Np'' = Bit\_Np' << S$$

where << is a sign representing bit shift to the left. After that, an output color calculation unit 1204 determines the output colors of the basic image forming unit by looking up a color conversion table 1203.

In the third embodiment, the bit counts of the spectral auxiliary coefficients PQR after the bit reduction process are 4, but the bit count setting of the spectral auxiliary coefficients is not limited to it. The third embodiment can be practiced as long as the bit count is smaller than that of the fundamental stimulus value.

As described above, the third embodiment can provide an image processing method of setting the bit count per pixel of the spectral auxiliary coefficient smaller than the bit count of the fundamental stimulus value, thereby reducing the data capacity without decreasing the resolution of a spectral image.

Fourth Embodiment

In the third embodiment, the bit counts per pixel of spectral auxiliary coefficients (PQR values) are equal to each other for all PQR images. In the fourth embodiment, the bit counts of the spectral auxiliary coefficients of image data are set in consideration of the variation ranges of the spectral auxiliary coefficients PQR.

In the fourth embodiment, bit reduction (step S1601) of a spectral auxiliary coefficient image in FIG. 16 is executed by Bit_Np_p', Bit_Np_q', and Bit_Np_r' as spectral auxiliary coefficients P, Q, AND R after bit reduction:

$$Bit\_Np\_p' = Bit\_Np >> S\_p$$

$$Bit\_Np\_q' = Bit\_Np >> S\_q$$

$$Bit\_Np\_r' = Bit\_Np >> S\_r$$

where Bit_Np is the bit count of a spectral auxiliary coefficient before bit reduction, and S_p, S_q, and S_r are bit reduction amounts corresponding to the spectral auxiliary coefficients P, Q, and R.

The variation ranges of the PQR values meet P>Q>R, as shown in the histogram of the PQR values in FIG. 11. In the fourth embodiment, the bit reduction amount is set to S_p=2, S_q=4, and S_r=6. Letting Bit_Np=8 be the bit count of the spectral auxiliary coefficient before bit reduction, the bit counts of PQR images after bit reduction are Bit_Np_p'=6, Bit_Np_q'=4, and Bit_Np_r'=2.

Figure 19:
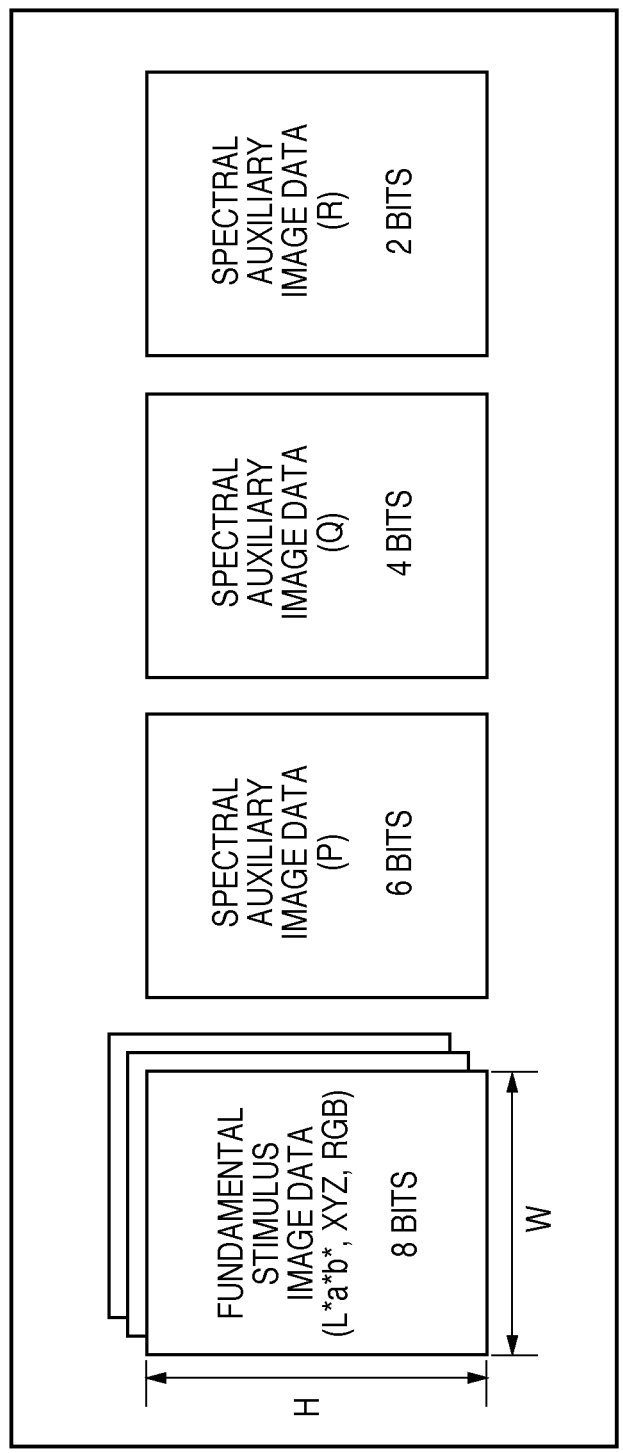
FIG. 19 is a view showing an example of image data according to the fourth embodiment.

FIG. 19 shows an example of spectral auxiliary images after reducing the bit count. In the fourth embodiment, the bit count after bit reduction satisfies P>Q>R in spectral auxiliary image data (P image data, Q image data, and R image data). At this time, the data capacity (byte count) of a spectral auxiliary image can be given by $$SIZE\_Np' = W \times H \times (Bit\_Np\_p' + Bit\_Np\_q' + Bit\_Np\_r')/8$$

Letting W=1280 and H=1024 be image sizes,

SIZE_Np'=1280×1024×(6+4+2)/8=1,966,080 bytes (about 1.88 Mbytes).

A spectral auxiliary coefficient calculation unit 1801 in FIG. 18 calculates again spectral auxiliary coefficients from data reduced by a bit reduction unit 1501:

$$Bit\_Np\_p'' = Bit\_Np\_p' << SS\_p$$

$$Bit\_Np\_q'' = Bit\_Np\_q' << SS\_q$$

$$Bit\_Np\_r'' = Bit\_Np\_r' << SS\_r$$

wherein Bit_Np_p", Bit_Np_q", and Bit_Np_r" are recalculated spectral auxiliary coefficients P, Q, and R.

Then, an output color calculation unit 1204 determines the output colors of the basic image forming unit by looking up a color conversion table 1203.

In the fourth embodiment, the bit counts of the spectral auxiliary coefficients P, Q, AND R after the bit reduction process are set to Bit_Np_p'=6, Bit_Np_q'=4, and Bit_Np_r'=2 in consideration of the variation ranges of the spectral auxiliary coefficients, but the bit count settings of the spectral auxiliary coefficients are not limited to them. Some spectral auxiliary coefficients may also have the same bit count after reduction. For example, the same bit count is held for Q and R, like Bit_Np_p'=6, Bit_Np_q'=4, and Bit_Np_r'=4. Even in this case, the fourth embodiment can be practiced.

As described above, according to the fourth embodiment, the bit counts per pixel of the spectral auxiliary coefficients change stepwise in consideration of the bit counts of fundamental stimulus values and the degree of influence on spectral information. The fourth embodiment can provide an image processing method capable of suppressing a decrease in color reproduction precision without decreasing the resolution of a spectral image.

Fifth Embodiment

In the first, third, and fourth embodiments, the image sizes corresponding to the spectral auxiliary coefficients (PQR values) after image size conversion are equal to each other for all PQR images. In the second embodiment, the image sizes corresponding to the spectral auxiliary coefficients are converted in consideration of the degree of influence on spectral information, but the data capacities per pixel of all PQR images are equal to the capacities of the fundamental stimulus values (L*a*b* values). In the fifth embodiment, the sizes of spectral auxiliary images are converted in consideration of the degree of influence on spectral information. The bit count per pixel of the spectral auxiliary coefficient is smaller than the bit count of the fundamental stimulus value.

Figure 20:
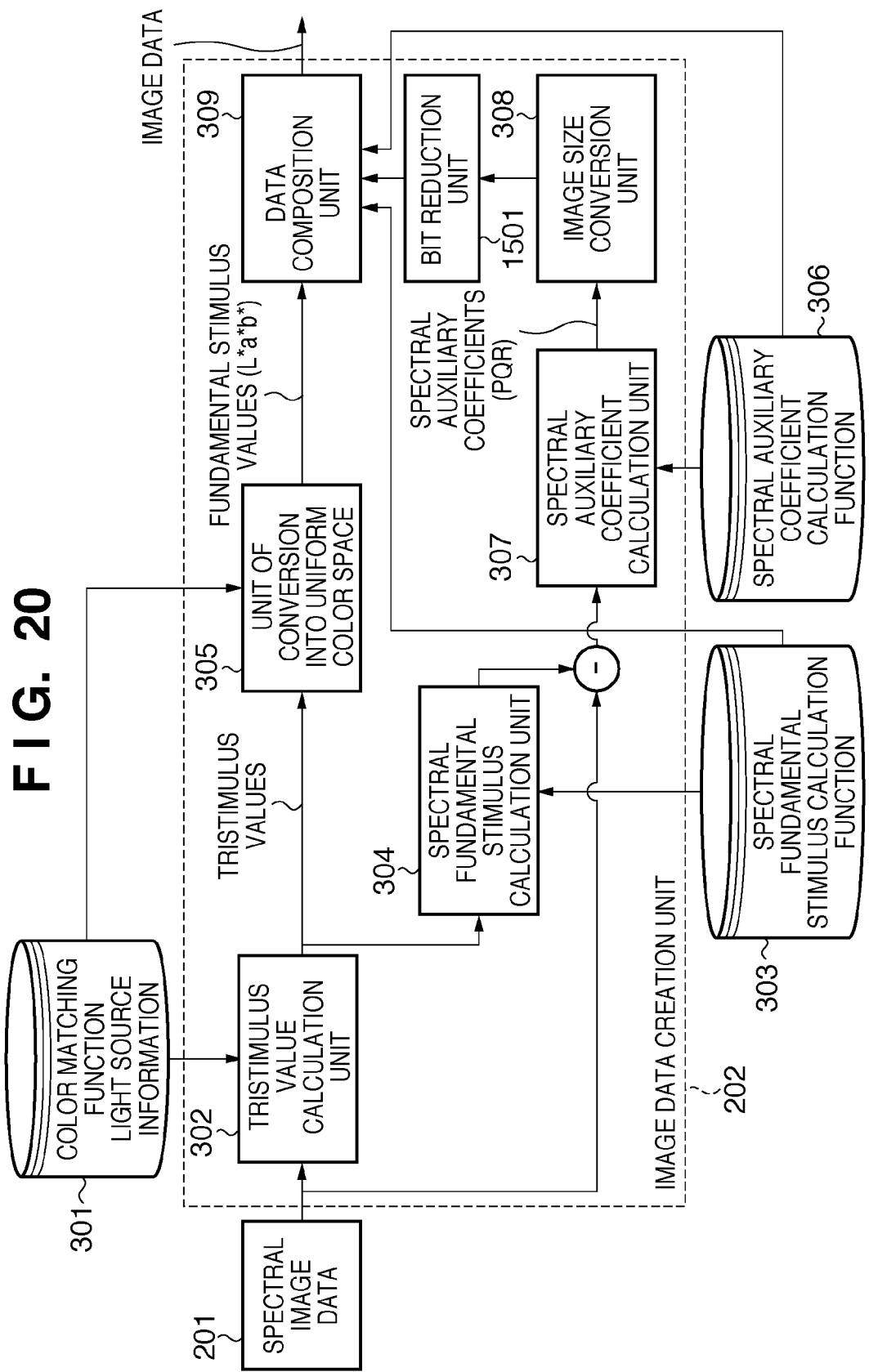
FIG. 20 is a block diagram showing the arrangement of an image data creation unit in FIG. 2 according to the fifth embodiment.

FIG. 20 is a block diagram showing the arrangement of an image data creation unit 202 in the fifth embodiment. The image data creation unit 202 is configured by adding a bit reduction unit 1501 to the image data creation unit of FIG. 3.

Figure 21:
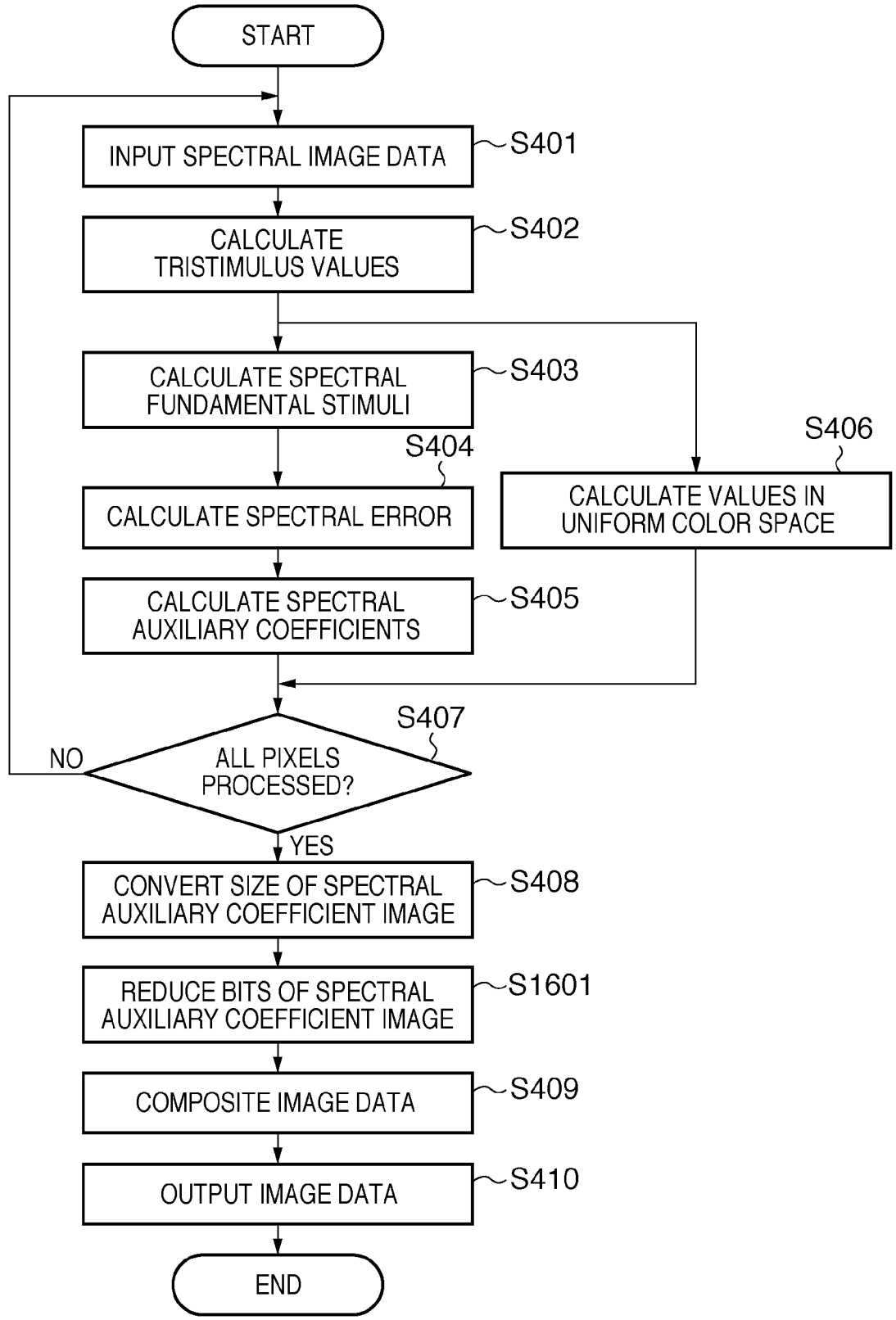
FIG. 21 is a flowchart showing the operation of the image data creation unit in FIG. 20.

FIG. 21 is a flowchart for explaining the operation of the image data creation unit in FIG. 20. This flowchart is obtained by adding bit reduction (step S1601) of a spectral auxiliary coefficient image to the flowchart of the image data creation unit in FIG. 4. Bit reduction of a spectral auxiliary coefficient image is the same as the method executed in the third and fourth embodiments.

In the image data creation unit 202 according to the fifth embodiment, for example, an image size conversion unit 308 converts an image size corresponding to a spectral auxiliary coefficient, and the bit reduction unit 1501 reduces the bit count. This is merely an example, and the order of the image size conversion and bit reduction process procedures may also be reversed.

Figure 22:
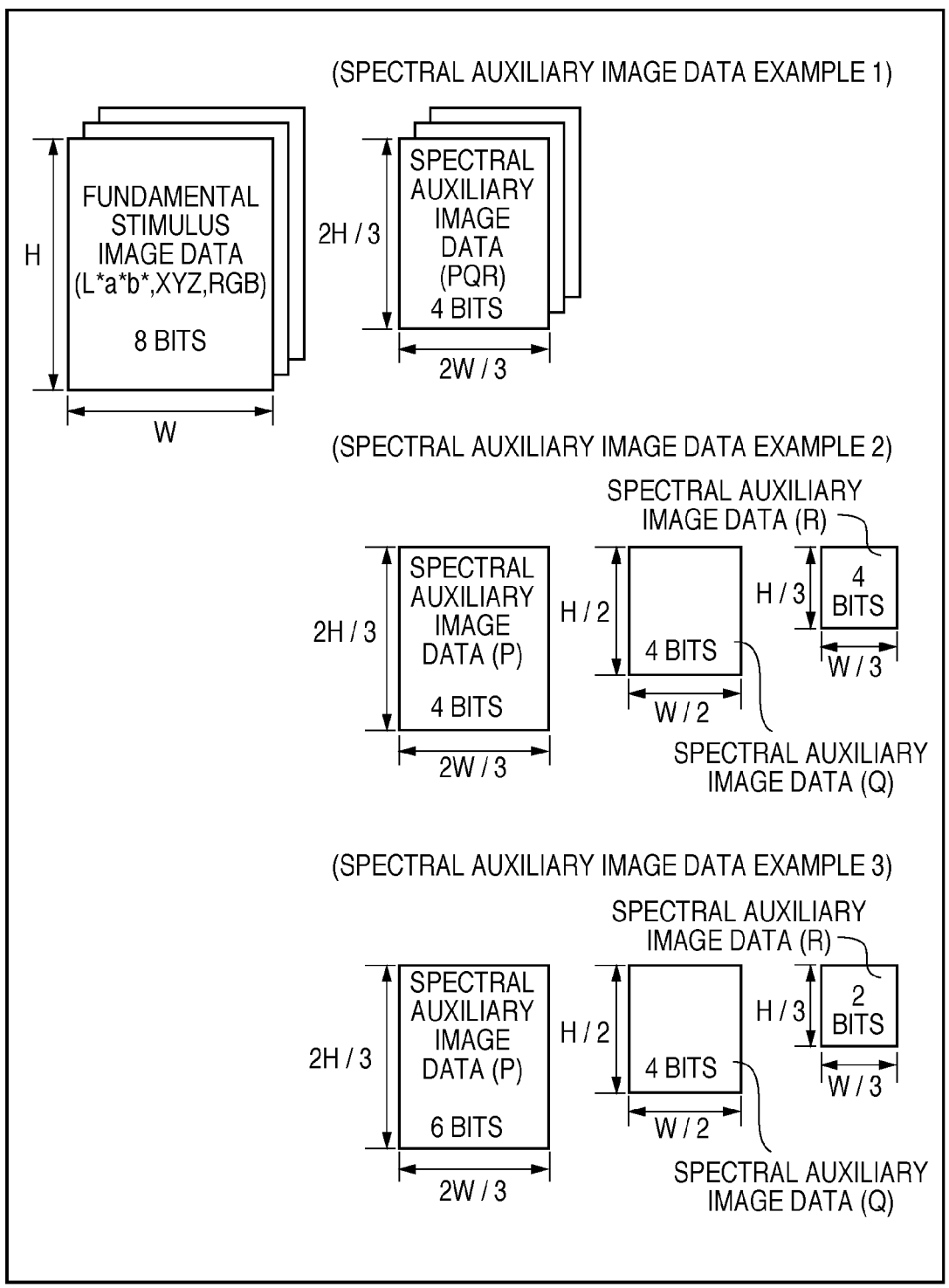
FIG. 22 is a view showing an example of image data according to the fifth embodiment.

FIG. 22 shows three examples of spectral auxiliary images obtained by reducing the bit count after converting the image size. In "spectral auxiliary image data example 1" of FIG. 22, the image sizes corresponding to the spectral auxiliary coefficients P, Q, AND R after image size conversion are made equal to each other, and all the bit counts of spectral auxiliary image data after bit reduction are 4. In "spectral auxiliary image data example 2", the image sizes corresponding to the spectral auxiliary coefficients after image size conversion change stepwise in consideration of the degree of influence on spectral information, and all the bit counts of spectral auxiliary image data after bit reduction are 4. Finally in "spectral auxiliary image data example 3", the image sizes corresponding to the spectral auxiliary coefficients after image size conversion, and the bit counts of spectral auxiliary image data after bit reduction change stepwise in consideration of the degree of influence on spectral information.

Figure 23:
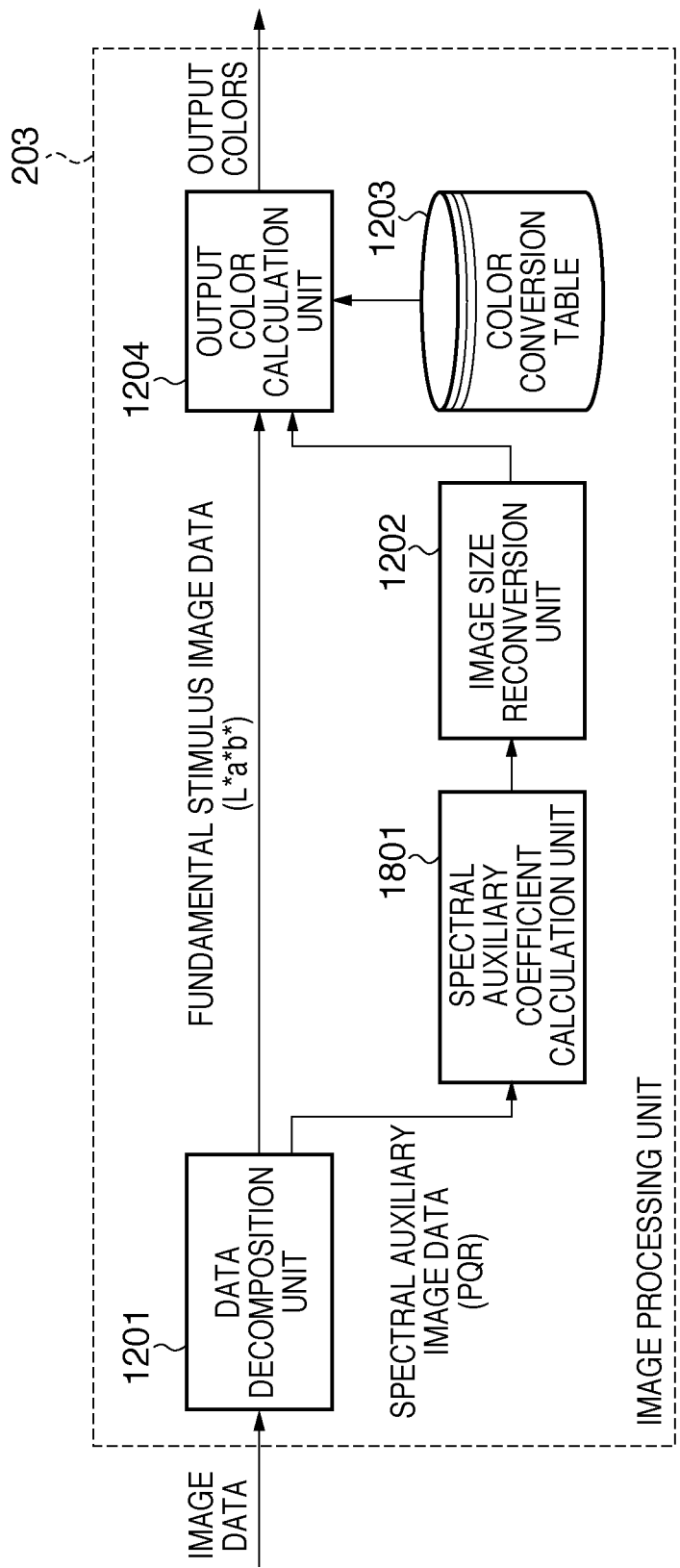
FIG. 23 is a block diagram showing the arrangement of an image processing unit in FIG. 2 according to the fifth embodiment.

FIG. 23 is a block diagram showing the arrangement of an image processing unit 203 in the fifth embodiment. The image processing unit 203 is configured by adding a spectral auxiliary coefficient calculation unit 1801 to the block diagram of FIG. 12. The operation of the spectral auxiliary coefficient calculation unit 1801 has been described above. As process procedures to spectral auxiliary image data, the spectral auxiliary coefficient is calculated, and then the image size is converted again. Even if the order of the process procedures is reversed, the fifth embodiment can be practiced.

As described above, according to the fifth embodiment, the image size corresponding to the spectral auxiliary coefficient is set smaller than that corresponding to the fundamental stimulus value. At the same time, the bit count per pixel of the spectral auxiliary coefficient image is set smaller than the bit count of the fundamental stimulus value. The fifth embodiment can provide an image processing method of further reducing the data capacity while suppressing a decrease in color reproduction precision.

Sixth Embodiment

In the first to fifth embodiments, the size of an image which holds a spectral auxiliary coefficient and the bit count per pixel are defined in advance. In the sixth embodiment, the user can designate the size of a spectral auxiliary image and the bit count per pixel via a user interface.

FIG. 24 shows an example of a user interface for designating the size of a spectral auxiliary image and the bit count per pixel. This user interface allows the user to change even the number of dimensions of a spectral auxiliary image in addition to the size of a spectral auxiliary image and the bit count per pixel. An image data creation unit 202 creates image data in accordance with the number of dimensions, image size, and bit count which are input from the user interface.

As described above, according to the sixth embodiment, the user designates the size of a spectral auxiliary image and the bit count per pixel. The sixth embodiment can achieve creation of image data and an image processing which meet user's preferences.

Seventh Embodiment

Image data (FIG. 7) used in the first to sixth embodiments includes a spectral auxiliary function made up of a spectral fundamental stimulus calculation function and spectral auxiliary coefficient calculation function. However, when the image processing unit need not reconstruct spectral information from fundamental stimulus image data and spectral auxiliary image data, image data need not hold the spectral auxiliary function. Even with a structure which stores a header, fundamental stimulus image data, and spectral auxiliary image data, the first to sixth embodiments can be practiced.

The first to sixth embodiments use a six-dimensional Lab-PQR as an example of the color space, but the number of dimensions of the spectral space complying with CIELAB is not limited to three. The color space may also be a four-dimensional color space formed from a P value corresponding to the first principal component vector and CIELAB, or a five-dimensional color space formed from P and Q values corresponding to the first and second principal component vectors and CIELAB. The first to sixth embodiments can also be practiced even when a seven-dimensional or higher-dimensional color space including the fourth and subsequent principal component vectors is used.

The first to sixth embodiments use a data group including the spectral reflectances of a printout and the like when determining the spectral fundamental stimulus calculation function 303 for calculating spectral basic stimuli from fundamental stimulus values. However, the method of determining the spectral fundamental stimulus calculation function is not limited to this. The spectral fundamental stimulus calculation function may also be calculated using a color matching function, environment light source, and the like without using any specific data group.

The first to sixth embodiments use CIELAB as fundamental stimulus values, but may also use other basic stimuli. For example, tristimulus values under a specific environment light source, typified by CIELUV or CIEXYZ, or color values (e.g., R, G, and B) derived from them are also available. The first to sixth embodiments can also be practiced even when a color appearance model such as CIECAM97 or CIECAM02 considering the influence of color appearance is employed as fundamental stimulus values.

The present invention determines the size of an image corresponding to spectral information and the bit count per pixel in consideration of the property of the spectral auxiliary coefficient. The present invention can reduce the data capacity necessary to process spectral image data while suppressing a decrease in color reproduction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-281831 filed on Oct. 30, 2007, which is hereby incorporated by reference herein in its entirety.

The invention claimed is:

1. An image processing apparatus comprising:
an input unit configured to input image data which includes a plurality of fundamental stimulus values and a spectral auxiliary coefficient and represents an image; and
an image processing unit configured to perform image processing on the image data, wherein:
wherein the spectral auxiliary coefficient, included in the image data, corresponds to a spectral error between spectral information reconstructed from the plurality of fundamental stimulus values and spectral information of the image, and
a second image size corresponding to the spectral auxiliary coefficient representing the image is smaller than a first image size corresponding to the fundamental stimulus values representing the image.

2. The apparatus according to claim 1, further comprising a conversion unit configured to convert the second image size corresponding to the spectral auxiliary coefficient into a third image size equal to the first image size corresponding to the fundamental stimulus values.

3. The apparatus according to claim 1, wherein the spectral auxiliary coefficient corresponds to a principal component of the spectral error.

4. The apparatus according to claim 1, wherein the plurality of the fundamental stimulus values includes tristimulus values under a specific environment light source, or color values derived from the tristimulus values.

5. An image processing apparatus comprising:
an input unit configured to input image data which includes a plurality of fundamental stimulus values and a spectral auxiliary coefficient and represents an image; and
an image processing unit configured to perform image processing on the image data, wherein:
the spectral auxiliary coefficient, included in the image data, corresponds to a spectral error between spectral information reconstructed from the plurality of fundamental stimulus values and spectral information of the image,
the spectral auxiliary coefficient includes a first coefficient and a second coefficient having different degrees of influence on spectral information, which are included in the image data, the degree of influence corresponding to a variation range of each one of the first and second auxiliary coefficients when calculated based on a spectral error between spectral information reconstructed from the plurality of fundamental stimulus values and spectral information of the image; and
a second image size corresponding to the second coefficient representing the image is smaller than a first image size corresponding to the first coefficient representing the image.

6. The apparatus according to claim 5, further comprising a conversion unit configured to convert the second image size corresponding to the spectral auxiliary coefficient into a third image size equal to a fourth image size corresponding to at least one of the plurality of the fundamental stimulus values.

7. An image processing apparatus comprising:
an input unit configured to input image data which includes a plurality of fundamental stimulus values and a spectral auxiliary coefficient and represents an image; and
an image processing unit configured to perform image processing on the image data, wherein:
the spectral auxiliary coefficient, included in the image data, corresponds to a spectral error between spectral information reconstructed from the plurality of the fundamental stimulus values and spectral information of the image, and
a second bit count of the spectral auxiliary coefficient is smaller than a first bit count of at least one of the plurality of the fundamental stimulus values.

8. The apparatus according to claim 7, further comprising a conversion unit configured to convert the second bit count of the spectral auxiliary coefficient into a third bit count equal to the first bit count of at least one of the plurality of the fundamental stimulus values.

9. An image processing apparatus comprising:
an input unit configured to input image data which includes a plurality of fundamental stimulus values and a spectral auxiliary coefficient and represents an image; and
an image processing unit configured to perform image processing on the image data, wherein:
wherein the spectral auxiliary coefficient, included in the image data, corresponds to a spectral error between spectral information reconstructed from the plurality of fundamental stimulus values and spectral information of the image,
the spectral auxiliary coefficient includes a first coefficient and a second coefficient having different degrees of influence on spectral information, which are included in the image data, the degree of influence corresponding to a variation range of each one of the first and second auxiliary coefficients when calculated based on a spectral error between spectral information reconstructed from the plurality of fundamental stimulus values and spectral information of the image; and
a second bit count of the second coefficient is smaller than a first bit count of the first coefficient.

10. The apparatus according to claim 9, further comprising a conversion unit configured to convert the first bit count of the first coefficient and the second bit count of the second coefficient into a third bit count equal to a fourth bit count of at least one of the plurality of the fundamental stimulus values.

11. An image processing apparatus comprising:
an input unit configured to input spectral information of an image;
a calculation unit configured to calculate a plurality of fundamental stimulus values and a spectral auxiliary coefficient from the spectral information;
a downscaling unit configured to downscale a third image size corresponding to the spectral auxiliary coefficient; and
a storage unit configured to store, as an image file, a combination of at least one of the plurality of the calculated fundamental stimulus values and the downscaled spectral auxiliary coefficient, wherein:
the spectral auxiliary coefficient corresponds to a spectral error between spectral information reconstructed from the plurality of fundamental stimulus values and spectral information of the image, and
a second image size corresponding to the spectral auxiliary coefficient stored in the image file is smaller than first image size corresponding to at least one of the plurality of the fundamental stimulus values stored in the image file.

12. An image processing apparatus comprising:
an input unit configured to input spectral information of an image;
a calculation unit configured to calculate a plurality of fundamental stimulus values and a spectral auxiliary coefficient from the spectral information;
a downscaling unit configured to downscale a third image size corresponding to the spectral auxiliary coefficient; and
a storage unit configured to store, as an image file, a combination of at least one of the plurality of the calculated fundamental stimulus values and the downscaled spectral auxiliary coefficient, wherein:
wherein the spectral auxiliary coefficient corresponds to a spectral error between spectral information reconstructed from the plurality of fundamental stimulus values and spectral information of the image,
the spectral auxiliary coefficient includes a first coefficient and a second coefficient having different degrees of influence on spectral information, the degree of influence corresponding to a variation range of each one of the first and second auxiliary coefficients when calculated based on a spectral error between spectral information reconstructed from the plurality of fundamental stimulus values and spectral information of the image; and
a second image size corresponding to the second coefficient is smaller than a first image size corresponding to the first coefficient.

13. An image processing apparatus comprising:
an input unit configured to input spectral information of an image;
a calculation unit configured to calculate a plurality of fundamental stimulus values and a spectral auxiliary coefficient from the spectral information;
a reduction unit configured to reduce a bit count of the spectral auxiliary coefficient; and
a storage unit configured to store, as an image file, a combination of at least one of the plurality of the calculated fundamental stimulus values and the reduced spectral auxiliary coefficient, wherein
the spectral auxiliary coefficient corresponds to a spectral error between spectral information reconstructed from the plurality of fundamental stimulus values and spectral information of the image, and
the second bit count of the spectral auxiliary coefficient is smaller than a first bit count of at least one of the plurality of the fundamental stimulus values.

14. An image processing apparatus comprising:
an input unit configured to input spectral information of an image;
a calculation unit configured to calculate a plurality of fundamental stimulus values and a spectral auxiliary coefficient from the spectral information;
a reduction unit configured to reduce a bit count of the spectral auxiliary coefficient; and
a storage unit configured to store, as an image file, a combination of at least one of the plurality of the calculated fundamental stimulus values and the reduced spectral auxiliary coefficient, wherein
the spectral auxiliary coefficient corresponds to a spectral error between spectral information reconstructed from the plurality of fundamental stimulus values and spectral information of the image,
the spectral auxiliary coefficient includes a first coefficient and a second coefficient having different degrees of influence on spectral information,
the degree of influence corresponding to a variation range of each one of the first and second auxiliary coefficients when calculated based on a spectral error between spectral information reconstructed from the plurality of fundamental stimulus values and spectral information of the image; and
a second bit count of the second coefficient is smaller than a first bit count of the first coefficient.

15. A method for image processing apparatus comprising the steps of:
inputting image data which includes a plurality of fundamental stimulus values and a spectral auxiliary coefficient and represents an image; and
performing image processing on the image data, wherein the spectral auxiliary coefficient corresponds to a spectral error between spectral information reconstructed from the plurality of fundamental stimulus values and spectral information of the image, and
a second image size corresponding to the spectral auxiliary coefficient representing the image is smaller than a first image size corresponding to at least one of the plurality of the fundamental stimulus values representing the image.

16. A method for image processing apparatus comprising the steps of:
inputting image data which includes a plurality of fundamental stimulus values and a spectral auxiliary coefficient and represents the image; and
performing image processing on the image data, wherein:
the spectral auxiliary coefficient corresponds to a spectral error between spectral information reconstructed from the plurality of fundamental stimulus values and spectral information of the image,
the spectral auxiliary coefficient includes a first coefficient and a second coefficient having different degrees of influence on spectral information,
the degree of influence corresponding to a variation range of each one of the first and second auxiliary coefficients when calculated based on a spectral error between spectral information reconstructed from the plurality of fundamental stimulus values and spectral information of the image; and
a second image size corresponding to the second coefficient representing the image is smaller than a first image size corresponding to the first coefficient representing the image.

17. A method for image processing apparatus comprising the steps of:
inputting image data which includes a plurality of fundamental stimulus values and a spectral auxiliary coefficient and represents an image; and
performing image processing on the image data, wherein:
the spectral auxiliary coefficient corresponds to a spectral error between spectral information reconstructed from the plurality of fundamental stimulus values and spectral information of the image, and
a second bit count of the spectral auxiliary coefficient is smaller than a first bit count of at least one of the plurality of the fundamental stimulus values.

18. A method for image processing apparatus comprising the steps of:
inputting image data which includes a plurality of fundamental stimulus values and a spectral auxiliary coefficient and represents an image; and performing image processing on the image data, wherein:
- the spectral auxiliary coefficient corresponds to a spectral error between spectral information reconstructed from the plurality of fundamental stimulus values and spectral information of the image,
- the spectral auxiliary coefficient includes a first coefficient and a second coefficient having different degrees of influence on spectral information,
- the degree of influence corresponding to a variation range of each one of the first and second auxiliary coefficients when calculated based on a spectral error between spectral information reconstructed from the plurality of fundamental stimulus values and spectral information of the image; and
- a second bit count of the second coefficient is smaller than a first bit count of the first coefficient.

19. A method for image processing apparatus comprising the steps of:
- inputting spectral information of an image;
- calculating a plurality of fundamental stimulus values and a spectral auxiliary coefficient from the spectral information;
- downscaling a third image size corresponding to the spectral auxiliary coefficient; and
- storing, as an image file, a combination of at least one of the plurality of the calculated fundamental stimulus values and the downscaled spectral auxiliary coefficient, wherein:
  - the spectral auxiliary coefficient corresponds to a spectral error between spectral information reconstructed from the plurality of fundamental stimulus values and spectral information of the image, and
  - a second image size corresponding to the spectral auxiliary coefficient stored in the image file is smaller than a first image size corresponding to at least one of the plurality of the fundamental stimulus values stored in the image file.

20. A method for image processing apparatus comprising the steps of:
- inputting spectral information of an image;
- calculating a plurality of fundamental stimulus values and a spectral auxiliary coefficient from the spectral information;
- downscaling third image size corresponding to the spectral auxiliary coefficient; and
- storing, as an image file, a combination of at least one of the plurality of the calculated fundamental stimulus values and the downscaled spectral auxiliary coefficient, wherein:
  - the spectral auxiliary coefficient corresponds to a spectral error between spectral information reconstructed from the plurality of fundamental stimulus values and spectral information of the image,
  - the spectral auxiliary coefficient includes a first coefficient and a second coefficient having different degrees of influence on spectral information,
  - the degree of influence corresponding to a variation range of each one of the first and second auxiliary coefficients when calculated based on a spectral error between spectral information reconstructed from the plurality of fundamental stimulus values and spectral information of the image; and
  - a second image size corresponding to the second coefficient is smaller than a first image size corresponding to the first coefficient.

21. A method for image processing apparatus comprising the steps of:
- inputting spectral information of an image;
- calculating a plurality of fundamental stimulus values and a spectral auxiliary coefficient from the spectral information;
- reducing a bit count of the spectral auxiliary coefficient; and
- storing, as an image file, a combination of at least one of the plurality of the calculated fundamental stimulus values and the reduced spectral auxiliary coefficient, wherein:
  - the spectral auxiliary coefficient corresponds to a spectral error between spectral information reconstructed from the plurality of fundamental stimulus values and spectral information of the image, and
  - the second bit count of the spectral auxiliary coefficient is smaller than a first bit count of at least one of the plurality of the fundamental stimulus values.

22. A method for image processing apparatus comprising the steps of:
- inputting spectral information of an image;
- calculating a plurality of fundamental stimulus values and a spectral auxiliary coefficient from the spectral information;
- reducing a bit count of the spectral auxiliary coefficient; and
- storing, as an image file, a combination of at least one of the plurality of the calculated fundamental stimulus values and the reduced spectral auxiliary coefficient, wherein:
  - the spectral auxiliary coefficient corresponds to a spectral error between spectral information reconstructed from the plurality of fundamental stimulus values and spectral information of the image,
  - the spectral auxiliary coefficient includes a first coefficient and a second coefficient having different degrees of influence on spectral information,
  - the degree of influence corresponding to a variation range of each one of the first and second auxiliary coefficients when calculated based on a spectral error between spectral information reconstructed from the plurality of fundamental stimulus values and spectral information of the image; and
  - a second bit count of the second coefficient is smaller than a first bit count of the first coefficient.

23. A non-transitory computer-readable storage medium storing a program for implementing the method defined in claim 15 by using a computer.

* * * * *